United States Patent
Neal, III et al.

(10) Patent No.: US 10,573,159 B2
(45) Date of Patent: Feb. 25, 2020

(54) ENGINE AND TRANSMISSION NOTIFICATION SYSTEM USING A J1939 DATA LINK INTERFACE

(71) Applicant: HALLIBURTON ENERGY SERVICES, INC., Houston, TX (US)

(72) Inventors: Charles Edward Neal, III, Duncan, OK (US); James Douglas Funkhouser, Duncan, OK (US); Derek Ray Williams, Duncan, OK (US); Gary Lee Cline, Duncan, OK (US); Chip Imel, Edmond, OK (US); Derek James Abel, Duncan, OK (US); Warren Neil Rattan, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/749,433

(22) PCT Filed: Sep. 2, 2015

(86) PCT No.: PCT/US2015/048163
§ 371 (c)(1),
(2) Date: Jan. 31, 2018

(87) PCT Pub. No.: WO2017/039657
PCT Pub. Date: Mar. 9, 2017

(65) Prior Publication Data
US 2018/0247512 A1 Aug. 30, 2018

(51) Int. Cl.
*G08B 21/18* (2006.01)
*G08B 3/10* (2006.01)
(Continued)

(52) U.S. Cl.
CPC ......... *G08B 21/18* (2013.01); *G05B 19/0428* (2013.01); *G05B 19/054* (2013.01);
(Continued)

(58) Field of Classification Search
CPC ...... E21B 21/08; E21B 41/0092; E21B 43/26; E21B 44/00; E21B 44/005; E21B 47/00;
(Continued)

(56) References Cited

U.S. PATENT DOCUMENTS 2,319,720 A * 5/1943 Chesnut .................. E21B 33/02
366/2
4,432,064 A 2/1984 Barker et al.
(Continued)

FOREIGN PATENT DOCUMENTS

WO 2013053977 A1 4/2013

OTHER PUBLICATIONS

Cementing, The HCR Elite® Cementing Unit, The Industry's Only Automatic Density Control® Mixing System with Twin HT-400™ Pumps for a Combined 1,025 Trailer Horsepower, H02669, Feb. 2008, 2 pages, Halliburton, Houston, TX.
(Continued)

*Primary Examiner* — Stephen R Burgdorf
(74) *Attorney, Agent, or Firm* — Polsinelli PC

(57) ABSTRACT

A cementing system having an engine control module, a transmission control module, a computing device and a display. The engine control module communicatively coupled with a plurality of engine sensors. The transmission control module communicatively coupled with a plurality of transmission sensor. The computing device is communicatively coupled with the display and communicatively coupled, via at least one J1939 data link, with the engine control module and the transmission control module. The computing device is configured to receive data from at least
(Continued)

one of an engine control module or a transmission control module, compare the received data to a list of stored codes and in response to the received data matching a stored code, causing the rendering of an alarm message associated with the matched code and/or a warning message associated with the matched code on the display.

15 Claims, 29 Drawing Sheets

(51) Int. Cl.
  *G05B 19/042* (2006.01)
  *G05B 19/05* (2006.01)
(52) U.S. Cl.
  CPC ........ *G08B 3/10* (2013.01); *G05B 2219/1105* (2013.01); *G05B 2219/13144* (2013.01)
(58) Field of Classification Search
  CPC ...... E21B 47/0005; E21B 47/04; E21B 47/06; G01F 1/007; G05B 19/0428; G05B 2219/1105; G05B 2219/13144; G06Q 10/06316; G06Q 10/0633; G06Q 10/20; G08B 3/10; G08B 21/18
  USPC .......................................................... 340/679
  See application file for complete search history.

(56) References Cited

U.S. PATENT DOCUMENTS

| | | | | |
|---|---|---|---|---|
| 6,795,935 | B1* | 9/2004 | Unkle | G05B 23/0275 340/438 |
| 2003/0196798 | A1 | 10/2003 | Newman et al. | |
| 2006/0245934 | A1 | 11/2006 | Deivasigamani | |
| 2008/0040065 | A1 | 2/2008 | Grant et al. | |
| 2008/0215700 | A1* | 9/2008 | Pillar | A62C 27/00 709/212 |
| 2009/0068031 | A1 | 3/2009 | Gambier et al. | |
| 2013/0098642 | A1 | 4/2013 | McLoughlin et al. | |
| 2015/0066432 | A1* | 3/2015 | Lee | G06F 11/3072 702/185 |
| 2015/0193993 | A1* | 7/2015 | Rood | G07C 5/0808 701/51 |
| 2015/0211537 | A1 | 7/2015 | Minteer et al. | |
| 2015/0269793 | A1* | 9/2015 | Collins | G07C 5/0808 701/31.4 |

OTHER PUBLICATIONS

Junger, Markus, Vector, Introduction to J1939, Version 1.1, Application Note AN-ION-1-3100, Apr. 27, 2010, Vector Informatik GmbH, Stuttgart, DE.

Axiomatic Global Electronic Solutions, Q&A—What is SAE J1939?, A.M.—Application Note, Jul. 6, 2006, Axiomatic Technologies Corporation, Canada.

International Search Report and Written Opinion; PCT Application No. PCT/US2015/048163; dated May 18, 2016.

Office Action; Canadian Application No. 2,994,227; dated Feb. 7, 2019.

Search Report; French Application No. 1657803; dated Sep. 24, 2018.

* cited by examiner

| SPN | FMI | Engine Description |
|---|---|---|
| 91 | 13 | throttle position calibration required |
| 91 | 8 | throttle position signal abnormal |
| 94 | 3 | fuel pressure open/short to +bat |
| 94 | 4 | fuel pressure short to ground |
| 94 | 15 | high fuel pressure warning |
| 100 | 17 | low engine oil pressure warning |
| 100 | 18 | low engine oil pressure derate |
| 100 | 1 | low engine oil pressure shut down |
| 102 | 3 | boost pressure sensor short to +bat |
| 102 | 3 | intake manifold pressure sensor short to +bat |
| 102 | 4 | boost pressure sensor short to ground |
| 102 | 4 | intake manifold pressure sensor short to ground |
| 102 | 10 | boost pressure sensor abnormal rate of change |
| 102 | 10 | intake manifold pressure sensor abnormal rate of change |
| 105 | 3 | intake manifold air temp open/short to +bat |
| 105 | 4 | intake manifold air temp short to ground |
| 105 | 15 | high intake manifold temperature warning |
| 105 | 0 | high intake manifold temperature shut down |
| 108 | 3 | atmospheric pressure open/short to +bat |
| 108 | 4 | atmospheric pressure short to ground |
| 110 | 3 | engine coolant temperature open/short to +bat |
| 110 | 4 | engine coolant temperature short to ground |
| 110 | 15 | high engine coolant temperature warning |
| 110 | 16 | high engine coolant temperature derate |
| 110 | 0 | high engine coolant temperature shut down |
| 111 | 2 | engine coolant level sensor loss of signal |
| 111 | 17 | low engine coolant temperature warning |
| 111 | 18 | low engine coolant temperature derate |
| 111 | 1 | low engine coolant temperature shut down |
| 168 | 0 | system voltage high |
| 168 | 1 | system voltage low |
| 168 | 2 | system voltage intermittent/erratic |
| 172 | 15 | air inlet temperature warning |
| 172 | 16 | air inlet temperature derate |
| 173 | 15 | exhaust gas temperature warning |
| 173 | 16 | exhaust gas temperature derate |
| 174 | 3 | fuel temperature sensor open/short to +bat |
| 174 | 4 | fuel temperature sensor short to ground |
| 174 | 15 | high fuel temperature warning |
| 174 | 16 | high fuel temperature derate |

FIG. 4A

| SPN | FMI | Engine Description |
|---|---|---|
| 174 | 0 | high fuel temperature shut down |
| 190 | 8 | engine speed signal abnormal |
| 190 | 15 | engine over speed warning |
| 190 | 0 | engine over speed shut down |
| 441 | 3 | auxiliary temperature sensor open/short to +bat |
| 441 | 4 | auxiliary temperature sensor short to ground |
| 441 | 15 | high auxiliary temperature warning |
| 441 | 16 | high auxiliary temperature derate |
| 441 | 0 | high auxiliary temperature shut down |
| 620 | 3 | 5 volt dc supply open/short to +bat |
| 620 | 4 | 5 volt dc supply short to ground |
| 626 | 5 | ether injection control solenoid current high |
| 626 | 6 | ether injection control solenoid current low |
| 630 | 2 | check programmable parameters |
| 631 | 2 | personality module mismatch |
| 637 | 13 | engine timing calibration required |
| 639 | 9 | j1939 data link communications |
| 651 | 5 | cylinder #1 injector open circuit |
| 651 | 6 | cylinder #1 injector short |
| 652 | 5 | cylinder #2 injector open circuit |
| 652 | 6 | cylinder #2 injector short |
| 653 | 5 | cylinder #3 injector open circuit |
| 653 | 6 | cylinder #3 injector short |
| 654 | 5 | cylinder #4 injector open circuit |
| 654 | 6 | cylinder #4 injector short |
| 655 | 5 | cylinder #5 injector open circuit |
| 655 | 6 | cylinder #5 injector short |
| 656 | 5 | cylinder #6 injector open circuit |
| 656 | 6 | cylinder #6 injector short |
| 657 | 5 | cylinder #7 injector open circuit |
| 657 | 6 | cylinder #7 injector short |
| 658 | 5 | cylinder #8 injector open circuit |
| 658 | 6 | cylinder #8 injector short |
| 659 | 5 | cylinder #9 injector open circuit |
| 659 | 6 | cylinder #9 injector short |
| 660 | 5 | cylinder #10 injector open circuit |
| 660 | 6 | cylinder #10 injector short |
| 661 | 5 | cylinder #11 injector open circuit |
| 661 | 6 | cylinder #11 injector short |
| 662 | 5 | cylinder #12 injector open circuit |

FIG. 4B

| SPN | FMI | Engine Description |
|---|---|---|
| 662 | 6 | cylinder #12 injector short |
| 678 | 3 | 8 volt dc supply open/short to +bat |
| 678 | 4 | 8 volt dc supply short to ground |
| 723 | 8 | secondary engine speed signal abnormal |
| 1079 | 3 | 5 volt dc supply open/short to +bat |
| 1079 | 4 | 5 volt dc supply short to ground |
| 1387 | 3 | auxiliary pressure sensor open/short to +bat |
| 1387 | 4 | auxiliary pressure sensor short to ground |
| 1387 | 15 | high auxiliary pressure warning |
| 1387 | 16 | high auxiliary pressure derate |
| 1387 | 0 | high auxiliary pressure shut down |

FIG. 4C

| SPN | FMI | Transmission Description |
|---|---|---|
| 120 | 15 | Retarder Oil Temp data valid but above normal range |
| 120 | 17 | Retarder Oil Temp data valid but below normal range |
| 120 | 31 | Retarder Oil Temp condition exists |
| 177 | 15 | Transmission OilTemp data valid but above normal range |
| 177 | 17 | Transmission OilTemp data valid but below normal range |
| 177 | 31 | Transmission OilTemp condition exists |
| 2003 | 31 | Transmission Fault condition exists |
| 3359 | 31 | Transmission Oil Filter condition exists |
| 4177 | 17 | Transmission Oil remaining Life low |
| 4178 | 31 | Transmission Service condition exists |

FIG. 5

| SPN | FMI | Transmission Description |
|---|---|---|
| P0122 | | Pedal Position Sensor Low Voltage |
| P0123 | | Pedal Position Sensor High Voltage |
| P0218 | | Transmission Fluid OverTemperature |
| P0562 | | System Voltage - Low |
| P0602 | | TCM Not Programmed |
| P0610 | | TCM Vehicle Options (TID) Error |
| P0613 | | TCM Processor |
| P0614 | | Torque Control Data Mismatch ECM/TCM |
| P0634 | | TCM Internal TemperatureToo High |
| P063E | | Auto Configuration Throttle Input Not Present |
| P063F | | Auto Configuration Engine Coolant Temp Input Not Present |
| P0657 | | Actuator Supply Voltage 1 (HSD1) Open |
| P0658 | | Actuator Supply Voltage 1 (HSD1) Low |
| P0659 | | Actuator Supply Voltage 1 (HSD1) High |
| P0702 | | Transmission Control System Electrical (TID) |
| P0703 | | Brake Switch Circuit Malfunction |
| P0708 | | Transmission Range Sensor Circuit High Input |
| P070C | | Transmission Fluid Level Sensor Circuit Low Input |
| P070D | | Transmission Fluid Level Sensor Circuit High Input |
| P0711 | | Transmission FluidTemperature Sensor Circuit Performance |
| P0712 | | Transmission FluidTemperature Sensor Circuit Low Input |
| P0713 | | Transmission FluidTemperature Sensor Circuit High Input |
| P0716 | | Turbine Speed Sensor Circuit Performance |
| P0717 | | Turbine Speed Sensor Circuit No Signal |
| P0719 | | Brake Switch ABS Input Low |
| P071A | | RELS Input Failed On |
| P071D | | General Purpose Input Fault |
| P0721 | | Output Speed Sensor Circuit Performance |
| P0722 | | Output Speed Sensor Circuit No Signal |
| P0726 | | Engine Speed Sensor Circuit Performance |
| P0727 | | Engine Speed Sensor Circuit No Signal |
| P0729 | | Incorrect 6th Gear Ratio |
| P0731 | | Incorrect 1st Gear Ratio |
| P0732 | | Incorrect 2nd Gear Ratio |
| P0733 | | Incorrect 3rd Gear Ratio |
| P0734 | | Incorrect 4th Gear Ratio |
| P0735 | | Incorrect 5th Gear Ratio |
| P0736 | | Incorrect Reverse Gear Ratio |
| P0741 | | Torque Converter Clutch System Stuck Off |
| P0752 | | Shift Solenoid 1 (SS1) Valve Performance Stuck On |

FIG. 6A

| SPN | FMI | Transmission Description |
|---|---|---|
| P0776 | | Pressure Control Solenoid 2 Stuck Off |
| P0777 | | Pressure Control Solenoid 2 Stuck On |
| P0796 | | Pressure Control Solenoid 3 Stuck Off |
| P0797 | | Pressure Control Solenoid 3 Stuck On |
| P0842 | | Transmission Pressure Switch 1 Circuit Low |
| P0843 | | Transmission Pressure Switch 1 Circuit High |
| P0847 | | Pressure Switch 2 (PS2) Circuit Low |
| P0848 | | Pressure Switch 2 (PS2) Circuit High |
| P0880 | | TCM Power Input Signal |
| P0881 | | TCM Power Input Signal Performance |
| P0882 | | TCM Power Input Signal Low |
| P0883 | | TCM Power Input Signal High |
| P088A | | Transmission Fluid Filter Deteriorated |
| P088B | | Transmission Fluid Filter Very Deteriorated (Expired) |
| P0894 | | Transmission Component Slipping |
| P0897 | | Transmission Fluid Deteriorated |
| P0960 | | Pressure Control Solenoid Main Mod Control Circuit Open |
| P0962 | | Pressure Control Solenoid Main Mod Control Circuit Low |
| P0963 | | Pressure Control Solenoid Main Mod Control Circuit High |
| P0964 | | Pressure Control Solenoid 2 (PCS2) Control Circuit Open |
| P0966 | | Pressure Control Solenoid 2 (PCS2) Control Circuit Low |
| P0967 | | Pressure Control Solenoid 2 (PCS2) Control Circuit High |
| P0968 | | Pressure Control Solenoid 3 (PCS3) Control Circuit Open |
| P0970 | | Pressure Control Solenoid 3 (PCS3) Control Circuit Low |
| P0971 | | Pressure Control Solenoid 3 (PCS3) Control Circuit High |
| P0973 | | Shift Solenoid 1 (SS1) Control Circuit Low |
| P0974 | | Shift Solenoid 1 (SS1) Control Circuit High |
| P0975 | | Shift Solenoid 2 (SS2) Control Circuit Open |
| P0976 | | Shift Solenoid 2 (SS2) Control Circuit Low |
| P0977 | | Shift Solenoid 2 (SS2) Control Circuit High |
| P0989 | | Retarder Pressure Sensor Failed Low |
| P0990 | | Retarder Pressure Sensor Failed High |
| P1739 | | Incorrect Low Gear Ratio |
| P1891 | | Throttle Position Sensor PWM Signal Low Input |
| P1892 | | Throttle Position Sensor PWM Signal High Input |
| P2184 | | Engine Coolant Temperature Sensor Circuit Low Input |
| P2185 | | Engine Coolant Temperature Sensor Circuit High Input |
| P2637 | | Torque Management Feedback Signal (SEM) |
| P2641 | | Torque Management Feedback Signal (LRTP) |
| P2669 | | Actuator Supply Voltage 2 (HSD2) Open |

FIG. 6B

| SPN | FMI | Transmission Description |
|---|---|---|
| P2670 | | Actuator Supply Voltage 2 (HSD2) Low |
| P2671 | | Actuator Supply Voltage 2 (HSD2) High |
| P2684 | | Actuator Supply Voltage 3 (HSD3) Open |
| P2685 | | Actuator Supply Voltage 3 (HSD3) Low |
| P2686 | | Actuator Supply Voltage 3 (HSD3) High |
| P2714 | | Pressure Control Solenoid 4 (PCS4) Stuck Off |
| P2715 | | Pressure Control Solenoid 4 (PCS4) Stuck On |
| P2718 | | Pressure Control Solenoid 4 (PCS4) Control Circuit Open |
| P2720 | | Pressure Control Solenoid 4 (PCS4) Control Circuit Low |
| P2721 | | Pressure Control Solenoid 4 (PCS4) Control Circuit High |
| P2723 | | Pressure Control Solenoid 1 (PCS1) Stuck Off |
| P2724 | | Pressure Control Solenoid 1 (PCS1) Stuck On |
| P2727 | | Pressure Control Solenoid 1 (PCS1) Control Circuit Open |
| P2729 | | Pressure Control Solenoid 1 (PCS1) Control Circuit Low |
| P2730 | | Pressure Control Solenoid 1 (PCS1) Control Circuit High |
| P2736 | | Pressure Control Solenoid 5 (PCS5) Control Circuit Open |
| P2738 | | Pressure Control Solenoid 5 (PCS5) Control Circuit Low |
| P2739 | | Pressure Control Solenoid 5 (PCS5) Control Circuit High |
| P2740 | | Retarder Oil Temperature Hot |
| P2742 | | Retarder Oil Temperature Sensor Circuit Low Input |
| P2743 | | Retarder Oil Temperature Sensor Circuit High Input |
| P2761 | | TCC PCS Control Circuit Open |
| P2763 | | TCC PCS Control Circuit High |
| P2764 | | TCC PCS Control Circuit Low |
| P2789 | | Clutch Adaptive Learning At Limit |
| P278A | | Kick down Input Failed ON |
| P2793 | | Gear Shift Direction Circuit |
| P2808 | | Pressure Control Solenoid 6 (PCS6) Stuck Off |
| P2809 | | Pressure Control Solenoid 6 (PCS6) Stuck On |
| P2812 | | Pressure Control Solenoid 6 (PCS6) Control Circuit Open |
| P2814 | | Pressure Control Solenoid 6 (PCS6) Control Circuit Low |
| P2815 | | Pressure Control Solenoid 6 (PCS6) Control Circuit High |
| U0001 | | Hi Speed CAN Bus Reset Counter Overrun (IESCAN) |
| U0010 | | CAN BUS Reset Counter Overrun |
| U0100 | | Lost Communications with ECM/PCM (J1587) |
| U0103 | | Lost Communication With Gear Shift Module (Shift Selector) 1 |
| U0115 | | Lost Communication With ECM |
| U0291 | | Lost Communication With Gear Shift Module (Shift Selector) 2 |
| U0304 | | Incompatible Gear Shift Module 1 (Shift Selector) ID |
| U0333 | | Incompatible Gear Shift Module 2 (Shift Selector) ID |

FIG. 6C

| SPN | FMI | Transmission Description |
|---|---|---|
| U0400 | | Invalid J1939 Communications |
| U0404 | | Invalid Data Received From Gear Shift Module (Shift Selector) 1 |
| U0442 | | Invalid Data Received from ECM/PCM B (CAN1/J1939) |
| U0592 | | Invalid Data Received From Gear Shift Module (Shift Selector) 2 |
| C1312 | | Retarder Request sensor failed low |
| C1313 | | Retarder Request sensor failed high |

FIG. 6D

| SPN | FMI | Description |
| --- | --- | --- |
| 91 | 13 | throttle position calibration required |
| 91 | 8 | throttle position signal abnormal |
| 94 | 3 | fuel pressure open/short to +bat |
| 94 | 4 | fuel pressure short to ground |
| 94 | 15 | high fuel pressure warning |
| 100 | 17 | low engine oil pressure warning |
| 100 | 18 | low engine oil pressure derate |
| 100 | 1 | low engine oil pressure shut down |
| 102 | 3 | boost pressure sensor short to +bat |
| 102 | 3 | intake manifold pressure sensor short to +bat |
| 102 | 4 | boost pressure sensor short to ground |
| 102 | 4 | intake manifold pressure sensor short to ground |
| 102 | 10 | boost pressure sensor abnormal rate of change |
| 102 | 10 | intake manifold pressure sensor abnormal rate of change |
| 105 | 3 | intake manifold air temp open/short to +bat |
| 105 | 4 | intake manifold air temp short to ground |
| 105 | 15 | high intake manifold temperature warning |
| 105 | 0 | high intake manifold temperature shut down |
| 108 | 3 | atmospheric pressure open/short to +bat |
| 108 | 4 | atmospheric pressure short to ground |
| 110 | 3 | engine coolant temperature open/short to +bat |
| 110 | 4 | engine coolant temperature short to ground |
| 110 | 15 | high engine coolant temperature warning |
| 110 | 16 | high engine coolant temperature derate |
| 110 | 0 | high engine coolant temperature shut down |
| 111 | 2 | engine coolant level sensor loss of signal |
| 111 | 17 | low engine coolant temperature warning |
| 111 | 18 | low engine coolant temperature derate |
| 111 | 1 | low engine coolant temperature shut down |
| 168 | 0 | system voltage high |
| 168 | 1 | system voltage low |
| 168 | 2 | system voltage intermittent/erratic |
| 172 | 15 | air inlet temperature warning |
| 172 | 16 | air inlet temperature derate |
| 173 | 15 | exhaust gas temperature warning |
| 173 | 16 | exhaust gas temperature derate |
| 174 | 3 | fuel temperature sensor open/short to +bat |
| 174 | 4 | fuel temperature sensor short to ground |
| 174 | 15 | high fuel temperature warning |
| 174 | 16 | high fuel temperature derate |

FIG. 9A

| SPN | FMI | Engine Description |
|---|---|---|
| 174 | 0 | high fuel temperature shut down |
| 190 | 8 | engine speed signal abnormal |
| 190 | 15 | engine over speed warning |
| 190 | 0 | engine over speed shut down |
| 441 | 3 | auxiliary temperature sensor open/short to +bat |
| 441 | 4 | auxiliary temperature sensor short to ground |
| 441 | 15 | high auxiliary temperature warning |
| 441 | 16 | high auxiliary temperature derate |
| 441 | 0 | high auxiliary temperature shut down |
| 620 | 3 | 5 volt dc supply open/short to +bat |
| 620 | 4 | 5 volt dc supply short to ground |
| 626 | 5 | ether injection control solenoid current high |
| 626 | 6 | ether injection control solenoid current low |
| 630 | 2 | check programmable parameters |
| 631 | 2 | personality module mismatch |
| 637 | 13 | engine timing calibration required |
| 639 | 9 | j1939 data link communications |
| 651 | 5 | cylinder #1 injector open circuit |
| 651 | 6 | cylinder #1 injector short |
| 652 | 5 | cylinder #2 injector open circuit |
| 652 | 6 | cylinder #2 injector short |
| 653 | 5 | cylinder #3 injector open circuit |
| 653 | 6 | cylinder #3 injector short |
| 654 | 5 | cylinder #4 injector open circuit |
| 654 | 6 | cylinder #4 injector short |
| 655 | 5 | cylinder #5 injector open circuit |
| 655 | 6 | cylinder #5 injector short |
| 656 | 5 | cylinder #6 injector open circuit |
| 656 | 6 | cylinder #6 injector short |
| 657 | 5 | cylinder #7 injector open circuit |
| 657 | 6 | cylinder #7 injector short |
| 658 | 5 | cylinder #8 injector open circuit |
| 658 | 6 | cylinder #8 injector short |
| 659 | 5 | cylinder #9 injector open circuit |
| 659 | 6 | cylinder #9 injector short |
| 660 | 5 | cylinder #10 injector open circuit |
| 660 | 6 | cylinder #10 injector short |
| 661 | 5 | cylinder #11 injector open circuit |
| 661 | 6 | cylinder #11 injector short |
| 662 | 5 | cylinder #12 injector open circuit |

FIG. 9B

| SPN | FMI | Description |
| --- | --- | --- |
| 662 | 6 | cylinder #12 injector short |
| 678 | 3 | 8 volt dc supply open/short to +bat |
| 678 | 4 | 8 volt dc supply short to ground |
| 723 | 8 | secondary engine speed signal abnormal |
| 1079 | 3 | 5 volt dc supply open/short to +bat |
| 1079 | 4 | 5 volt dc supply short to ground |
| 1387 | 3 | auxiliary pressure sensor open/short to +bat |
| 1387 | 4 | auxiliary pressure sensor short to ground |
| 1387 | 15 | high auxiliary pressure warning |
| 1387 | 16 | high auxiliary pressure derate |
| 1387 | 0 | high auxiliary pressure shut down |
| 120 | 15 | Retarder Oil Temp data valid but above normal range |
| 120 | 17 | Retarder Oil Temp data valid but below normal range |
| 120 | 31 | Retarder Oil Temp condition exists |
| 177 | 15 | Transmission OilTemp data valid but above normal range |
| 177 | 17 | Transmission OilTemp data valid but below normal range |
| 177 | 31 | Transmission OilTemp condition exists |
| 2003 | 31 | Transmission Fault condition exists |
| 3359 | 31 | Transmission Oil Filter condition exists |
| 4177 | 17 | Transmission Oil remaining Life low |
| 4178 | 31 | Transmission Service condition exists |
| P0122 |  | Pedal Position Sensor Low Voltage |
| P0123 |  | Pedal Position Sensor High Voltage |
| P0218 |  | Transmission Fluid OverTemperature |
| P0562 |  | System Voltage - Low |
| P0602 |  | TCM Not Programmed |
| P0610 |  | TCM Vehicle Options (TID) Error |
| P0613 |  | TCM Processor |
| P0614 |  | Torque Control Data Mismatch ECM/TCM |
| P0634 |  | TCM Internal TemperatureToo High |
| P063E |  | Auto Configuration Throttle Input Not Present |
| P063F |  | Auto Configuration Engine Coolant Temp Input Not Present |
| P0657 |  | Actuator Supply Voltage 1 (HSD1) Open |
| P0658 |  | Actuator Supply Voltage 1 (HSD1) Low |
| P0659 |  | Actuator Supply Voltage 1 (HSD1) High |
| P0702 |  | Transmission Control System Electrical (TID) |
| P0703 |  | Brake Switch Circuit Malfunction |
| P0708 |  | Transmission Range Sensor Circuit High Input |
| P070C |  | Transmission Fluid Level Sensor Circuit Low Input |
| P070D |  | Transmission Fluid Level Sensor Circuit High Input |
| P0711 |  | Transmission FluidTemperature Sensor Circuit Performance |
| P0712 |  | Transmission FluidTemperature Sensor Circuit Low Input |

FIG. 9C

| | |
|---|---|
| P0713 | Transmission FluidTemperature Sensor Circuit High Input |
| P0716 | Turbine Speed Sensor Circuit Performance |
| P0717 | Turbine Speed Sensor Circuit No Signal |
| P0719 | Brake Switch ABS Input Low |
| P071A | RELS Input Failed On |
| P071D | General Purpose Input Fault |
| P0721 | Output Speed Sensor Circuit Performance |
| P0722 | Output Speed Sensor Circuit No Signal |
| P0726 | Engine Speed Sensor Circuit Performance |
| P0727 | Engine Speed Sensor Circuit No Signal |
| P0729 | Incorrect 6th Gear Ratio |
| P0731 | Incorrect 1st Gear Ratio |
| P0732 | Incorrect 2nd Gear Ratio |
| P0733 | Incorrect 3rd Gear Ratio |
| P0734 | Incorrect 4th Gear Ratio |
| P0735 | Incorrect 5th Gear Ratio |
| P0736 | Incorrect Reverse Gear Ratio |
| P0741 | Torque Converter Clutch System Stuck Off |
| P0752 | Shift Solenoid 1 (SS1) Valve Performance Stuck On |
| P0776 | Pressure Control Solenoid 2 Stuck Off |
| P0777 | Pressure Control Solenoid 2 Stuck On |
| P0796 | Pressure Control Solenoid 3 Stuck Off |
| P0797 | Pressure Control Solenoid 3 Stuck On |
| P0842 | Transmission Pressure Switch 1 Circuit Low |
| P0843 | Transmission Pressure Switch 1 Circuit High |
| P0847 | Pressure Switch 2 (PS2) Circuit Low |
| P0848 | Pressure Switch 2 (PS2) Circuit High |
| P0880 | TCM Power Input Signal |
| P0881 | TCM Power Input Signal Performance |
| P0882 | TCM Power Input Signal Low |
| P0883 | TCM Power Input Signal High |
| P088A | Transmission Fluid Filter Deteriorated |
| P088B | Transmission Fluid Filter Very Deteriorated (Expired) |
| P0894 | Transmission Component Slipping |
| P0897 | Transmission Fluid Deteriorated |
| P0960 | Pressure Control Solenoid Main Mod Control Circuit Open |
| P0962 | Pressure Control Solenoid Main Mod Control Circuit Low |
| P0963 | Pressure Control Solenoid Main Mod Control Circuit High |
| P0964 | Pressure Control Solenoid 2 (PCS2) Control Circuit Open |
| P0966 | Pressure Control Solenoid 2 (PCS2) Control Circuit Low |
| P0967 | Pressure Control Solenoid 2 (PCS2) Control Circuit High |
| P0968 | Pressure Control Solenoid 3 (PCS3) Control Circuit Open |
| P0970 | Pressure Control Solenoid 3 (PCS3) Control Circuit Low |
| P0971 | Pressure Control Solenoid 3 (PCS3) Control Circuit High |

FIG. 9D

| Code | Description |
|---|---|
| P0973 | Shift Solenoid 1 (SS1) Control Circuit Low |
| P0974 | Shift Solenoid 1 (SS1) Control Circuit High |
| P0975 | Shift Solenoid 2 (SS2) Control Circuit Open |
| P0976 | Shift Solenoid 2 (SS2) Control Circuit Low |
| P0977 | Shift Solenoid 2 (SS2) Control Circuit High |
| P0989 | Retarder Pressure Sensor Failed Low |
| P0990 | Retarder Pressure Sensor Failed High |
| P1739 | Incorrect Low Gear Ratio |
| P1891 | Throttle Position Sensor PWM Signal Low Input |
| P1892 | Throttle Position Sensor PWM Signal High Input |
| P2184 | Engine Coolant Temperature Sensor Circuit Low Input |
| P2185 | Engine Coolant Temperature Sensor Circuit High Input |
| P2637 | Torque Management Feedback Signal (SEM) |
| P2641 | Torque Management Feedback Signal (LRTP) |
| P2669 | Actuator Supply Voltage 2 (HSD2) Open |
| P2670 | Actuator Supply Voltage 2 (HSD2) Low |
| P2671 | Actuator Supply Voltage 2 (HSD2) High |
| P2684 | Actuator Supply Voltage 3 (HSD3) Open |
| P2685 | Actuator Supply Voltage 3 (HSD3) Low |
| P2686 | Actuator Supply Voltage 3 (HSD3) High |
| P2714 | Pressure Control Solenoid 4 (PCS4) Stuck Off |
| P2715 | Pressure Control Solenoid 4 (PCS4) Stuck On |
| P2718 | Pressure Control Solenoid 4 (PCS4) Control Circuit Open |
| P2720 | Pressure Control Solenoid 4 (PCS4) Control Circuit Low |
| P2721 | Pressure Control Solenoid 4 (PCS4) Control Circuit High |
| P2723 | Pressure Control Solenoid 1 (PCS1) Stuck Off |
| P2724 | Pressure Control Solenoid 1 (PCS1) Stuck On |
| P2727 | Pressure Control Solenoid 1 (PCS1) Control Circuit Open |
| P2729 | Pressure Control Solenoid 1 (PCS1) Control Circuit Low |
| P2730 | Pressure Control Solenoid 1 (PCS1) Control Circuit High |
| P2736 | Pressure Control Solenoid 5 (PCS5) Control Circuit Open |
| P2738 | Pressure Control Solenoid 5 (PCS5) Control Circuit Low |
| P2739 | Pressure Control Solenoid 5 (PCS5) Control Circuit High |
| P2740 | Retarder Oil Temperature Hot |
| P2742 | Retarder Oil Temperature Sensor Circuit Low Input |
| P2743 | Retarder Oil Temperature Sensor Circuit High Input |
| P2761 | TCC PCS Control Circuit Open |
| P2763 | TCC PCS Control Circuit High |
| P2764 | TCC PCS Control Circuit Low |
| P2789 | Clutch Adaptive Learning At Limit |
| P278A | Kick down Input Failed ON |
| P2793 | Gear Shift Direction Circuit |
| P2808 | Pressure Control Solenoid 6 (PCS6) Stuck Off |
| P2809 | Pressure Control Solenoid 6 (PCS6) Stuck On |

FIG. 9E

| | |
|---|---|
| P2812 | Pressure Control Solenoid 6 (PCS6) Control Circuit Open |
| P2814 | Pressure Control Solenoid 6 (PCS6) Control Circuit Low |
| P2815 | Pressure Control Solenoid 6 (PCS6) Control Circuit High |
| U0001 | Hi Speed CAN Bus Reset Counter Overrun (IESCAN) |
| U0010 | CAN BUS Reset Counter Overrun |
| U0100 | Lost Communications with ECM/PCM (J1587) |
| U0103 | Lost Communication With Gear Shift Module (Shift Selector) 1 |
| U0115 | Lost Communication With ECM |
| U0291 | Lost Communication With Gear Shift Module (Shift Selector) 2 |
| U0304 | Incompatible Gear Shift Module 1 (Shift Selector) ID |
| U0333 | Incompatible Gear Shift Module 2 (Shift Selector) ID |
| U0400 | Invalid J1939 Communications |
| U0404 | Invalid Data Received From Gear Shift Module (Shift Selector) 1 |
| U0442 | Invalid Data Received from ECM/PCM B (CAN1/J1939) |
| U0592 | Invalid Data Received From Gear Shift Module (Shift Selector) 2 |
| C1312 | Retarder Request sensor failed low |
| C1313 | Retarder Request sensor failed high |

FIG. 9F

SAE J1939 Standards

- J1939  Recommended Practice for a Serial Control and Communications Vehicle Network

- J1939/01  Recommended Practice for Control And Communications Network for On-Highway Equipment

- J1939/11  Physical Layer - 250k bits/s, Twisted Shielded Pair

- J1939/13  Off-Board Diagnostic Connector

- J1939/I5  (J1939 Lite)Reduced Physical Layer, 250K bits/sec, Un-Shielded Twisted  Pair (UTP)

- JI939/21  Data Link Layer

- J1939/31  Network Layer

- J1939/71  Vehicle Application Layer

- J1939/73  Application Layer – Diagnostics

- J1939/75  Application Layer-Generator Sets and Industrial

- J1939/81  Network Management

- J1113-13  Electromagnetic Compatibility Measurement Procedure for Vehicle Components—Part 13—Immunity to Electrostatic Discharge

- J1128  Low-Tension Primary Cable

- J1213-1  Glossary of Vehicle Networks for Multiplexing and Data Communications

- J1213-2  Glossary of Reliability Terminology Associated with Automotive Electronics

- J1349  Engine Power Test Code—Spark Ignition and Compression Ignition—Net Power Rating

- J1455  Joint SAE/TMC Recommended Environmental Practices For Electronic Equipment Design (Heavy-Duty Trucks)

- J1587  Joint SAE/TMC Electronic Data Interchange Between Microcomputer Systems In Heavy-Duty Vehicle Applications

- J1708  Serial Data Communication Between Microcomputer Systems in Heavy Duty Vehicle Applications

- J1843 Accelerator Pedal Position Sensor For Use With Electronic Controls In Medium- And Heavy-Duty Vehicle Applications

FIG. 10A

SAE J1939 Standards (Continued)

- J1922 Power train Control Interface for Electronic Controls used in Medium and Heavy Duty Diesel On-Highway Vehicle Applications J1930 Electrical/Electronic Systems Diagnostic Terms, Definitions, Abbreviations, and Acronyms

- J1944 Truck & Bus Multipurpose Vehicle Windshield Washer System

- J1979 E/E Diagnostic Test Modes

- J2030 Heavy-Duty Electrical Connector Performance Standard

- J2403 Medium/Heavy-Duty E/E Systems Diagnosis Nomenclature

- 931809J1939 High Speed Serial Communications, the Next Generation Network for Heavy Duty Vehicles

- 940361 CAN Controller Architecture Optimized for SAE J1939 Applications

- 950043 Development Tools for SAE J1939 Networks on Tractors

- 972757 J1939 Serial Vehicle Network Explanation and Tutorial

- 972758 System Level Testing Using the J1939 Data link Adapter

- 972759 Dynamic Address Configuration in SAE J1939

- 1999-01-2840 Large-Scale Application of J-1939 CAN

Related Standards

- J2284 – Automotive CAN bus - Balloted to SAE Multiplex Committee

- ISO 9141 – OBD II Diagnostics

- ISO 11783 – Ag & Forestry Machinery

- ISO 11992 – Heavy Duty Vehicle J1939

- ISO 11898 – Light Duty Vehicle J1939

| Control | Job Status |
|---|---|
| Yes | Running |

| Stage |
|---|
| 9 - Stage |

Alarm Center

Alarm Center...

△
▽
ACK
(16)

Export View

Export View

Active Alarms

| Alarms & Warnings | Suppressed Alarms |
| Alarms Only | Warnings Only |
| Engine & Transmission Codes | |

Alarm History

| Alarms Warnings & Events | Events Only |
| Alarms Only | Warnings Only |

Eng Trans Codes

| | Date | Time | Number | Source | Area |
|---|---|---|---|---|---|
| 1 | 08/06/15 | 13:56:06.882 | 100032 | secondary engine speed signal abnormal (SPN 723, FMI 08) | Engine A |
| 2 | 08/06/15 | 13:56:03.185 | 100016 | 5 volt dc supply open / short to +bat (SPN 1079, FMI 03) | Engine A |
| 3 | 08/06/15 | 13:55:57.784 | 100008 | Auxiliary Temperature Sensor Open / Short to +bat (SPN 441, FMI 03) | Engine A |
| 4 | 08/06/15 | 13:55:52.185 | 100024 | intake manifold pressure sensor abnormal rate of change (SPN 102, FMI 101) | Engine A |
| 5 | 08/06/15 | 13:55:50.385 | 100000 | High Auxiliary Pressure Shutdown (SPN 1387, FMI 00) | Engine A |
| 6 | 08/06/15 | 13:47:26.119 | 100057 | high intake manifold temperature shutdown (SPN 105, FMI 00) | Engine A |
| 7 | 08/06/15 | 13:47:15.821 | 100056 | high intake manifold temperature warning (SPN 105, FMI 15) | Engine A |
| 8 | 08/06/15 | 13:47:08.090 | 100048 | j1939 data link communications (SPN 639, FMI 09) | Engine A |
| 9 | 08/06/15 | 13:46:47.027 | 100040 | low engine oil pressure warning (SPN 100, FMI 17) | Engine A |
| 10 | | | | | |
| 11 | | | | | |
| 12 | | | | | |

Colors Legend

| Numbers Legend | | | | | | | | View Events (12) | | | |
|---|---|---|---|---|---|---|---|---|---|---|---|
| Event Log | Enter Event | View Warnings | | | | | | | | | |
| Pre-Job | Job | Post-Job | Sys Config | Stage Setup | Schematic | LA Pumps | LA Tanks | Manual Valve Control | Pre-Job Routine | Valve Check | Offsets |

FIG. 12

| | Engine A | | Engine B | |
|---|---|---|---|---|
| | | | | Alarm Center... |
| | | | | ACK (8) |
| Control | Job Status | | | |
| Yes | Not Started | | | |
| Stage | | | | |
| 2 - Stage | | | | |
| Oil Pressure | Exhaust Gas Temp. | Oil Pressure | Exhaust Gas Temp. | |
| 60 psi | 195.7 F | 0 psi | -40.0 F | |
| Fuel Pressure | Battery Voltage | Fuel Pressure | Battery Voltage | |
| 12 psi | 13.5 v | 0 psi | 0.0 v | |
| Coolant Temp. | Trans. Oil Temp. | Coolant Temp. | Trans. Oil Temp. | |
| 135.0 F | 180.0 F | -40.0 F | -459.4 F | |
| Fuel Cooler Hyd Pr | | Fuel Cooler Hyd Pr | | |
| 9 psi | | 9 psi | | |
| Total Hours | | Total Hours | | |
| 90.0 hours | | 0.0 hours | | |

| Event Log | Enter Event | View Warnings | Pre-Job | Job | Post-Job | Sys Config | Pump Control | Mix Control | Schematic | LA Main | LA Pumps | Manual Valve Control | View Events (18) | Offsets | Engine Information |

ENGINE AND TRANSMISSION NOTIFICATION SYSTEM USING A J1939 DATA LINK INTERFACE

CROSS-REFERENCE TO RELATED APPLICATIONS

This application is a national stage entry of PCT/US2015/048163 filed Sep. 2, 2015, said application is expressly incorporated herein in its entirety.

FIELD

The present disclosure generally relates to an engine and transmission notification system for a cement or fluid mixing control system, and more specifically to an engine and transmission notification system for a cement or fluid mixing control system using a J1939 data link interface in which received sensor data causes the display of an alarm message or warning message, along with a description of the condition causing the alarm or warning.

BACKGROUND

Generally, after a wellbore has been drilled to a desired depth, completion operations are performed. Such completion operations can include cementing at least a portion of the wellbore. The introduction of a cement mixture into a wellbore can be accomplished using a cementing skid. Typically, engine controls associated with the cementing skid use blinking yellow and red fault indicator lights to provide a warning if there is a problem with the engine and/or transmission of the cementing skid. However, an operator may miss such warnings. In conventional cementing skids, the operator can receive a code in addition to the flashing yellow and red fault indicator lights. In response to the code, the operator decides whether to shut down the cementing process and wait for a technician to determine what the code is referring to. As a result, the cementing process can be halted while waiting for the technician to arrive and determine the meaning of the received code. Halting of the cementing process can cause costly delays.

BRIEF DESCRIPTION OF THE DRAWINGS

FIGS. 4A-4C are a list of engine codes in accordance with a first exemplary embodiment;

FIG. 5 is a list of transmission diagnostic trouble codes (DTCs) in accordance with a first exemplary embodiment;

FIGS. 6A-6D are a list of transmission codes in accordance with a first exemplary embodiment;

FIGS. 9A-9F is a single list of engine codes, transmission DTCs and transmission codes in accordance with an exemplary embodiment;

FIGS. 10A-10B is a list of conventional standard codes in accordance with an exemplary embodiment;

FIGS. 11A-11D are screenshots of a graphical user interface (GUI) displaying alarms and warnings for the engine and transmission codes in accordance with an exemplary embodiment;

FIG. 12 is a screenshot of a GUI displaying the engine information for Engine A and Engine B in accordance with an exemplary embodiment;

DETAILED DESCRIPTION

Figure 1A:
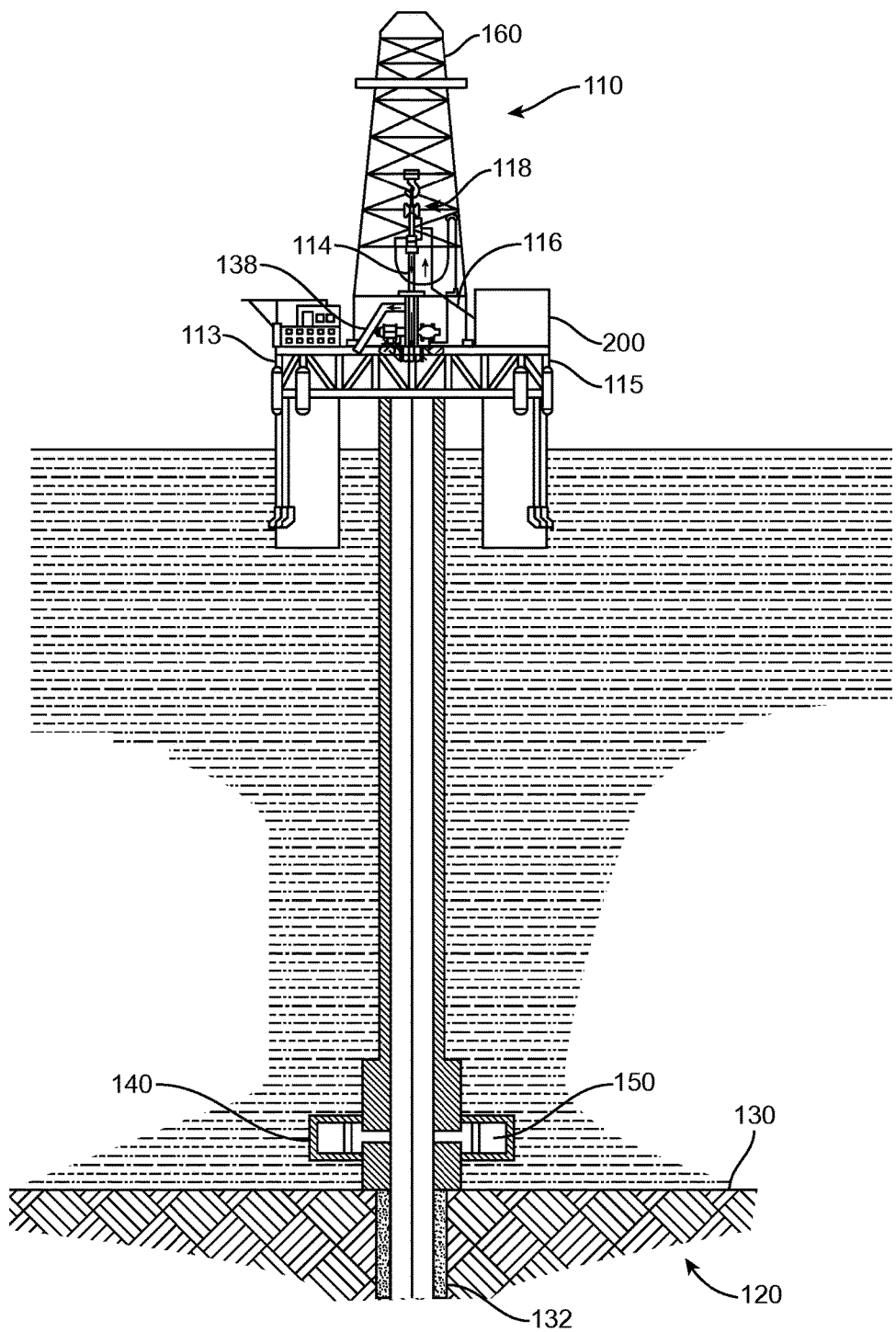
FIG. 1A is an overview of a system for delivering a cement composition in a wellbore in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or apparatus. Additionally, the illustrated embodiments are illustrated such that the orientation is such that the right-hand side or bottom of the page is downhole compared to the left-hand side, and the top of the page is toward the surface, and the lower side of the page is downhole.

Several definitions that apply throughout this disclosure will now be presented. The term "coupled" is defined as connected, whether directly or indirectly through intervening components, and is not necessarily limited to physical connections. The term "communicatively coupled" is defined as connected, either directly or indirectly through intervening components, and the connections are not necessarily limited to physical connections, but are connections that accommodate the transfer of data between the so-described components. The connections can be such that the objects are permanently connected or releasably connected. The terms "comprising," "including" and "having" are used interchangeably in this disclosure. The terms "comprising," "including" and "having" mean to include, but are not necessarily limited to, the things so described. A "processor" as used herein is an electronic circuit that can make determinations based upon inputs. A processor can include a microprocessor, a microcontroller, and/or a central processing unit, among others. While a single processor can be used, the present disclosure can be implemented using a plurality of processors. The term "transceiver" refers to a device having a combined transmitter and receiver or a separate transmitter and separate receiver. Alternatively, the transceiver can in a transmitter device and a receiver device.

The present disclosure relates to an engine and transmission notification system for a cementing system. The engine and transmission control system can include a plurality of engine sensors, engine control module, plurality of transmission sensors, transmission control module, a computing device and a display. The engine control module receives engine sensor data from the plurality of engine sensors, compares the received engine sensor data with one or more operating ranges, and can send the received engine sensor data and/or one or more codes when the received engine sensor data is outside of one or more operating ranges and/or falls within one or more abnormal operating ranges. The transmission control module receives transmission sensor data from the plurality of transmission sensors, compares the received transmission sensor data with one or more operating ranges, and can send the received transmission sensor data and/or one or more codes when the received transmission sensor data is outside of one or more operating ranges and/or falls within one or more abnormal operating ranges. The computing device can receive the sensor data and/or one or more codes from the engine control module and/or transmission control module and can compare each of the received codes with a list of codes stored in memory of the computing device. In response to a received code matching a stored code, the computing device can cause the rendering of at least one of an alarm message corresponding to a matched code or a warning message corresponding to a matched code on the display. As a result, an operator can see one or more alarm messages and/or one or more warning messages, without the need of a technician, and can take appropriate action since the one or more alarm messages and/or one or more warning messages provide an explanation for each of the received codes. In some situations, the operator can avoid having to shut down the cementing system compared to conventional systems where the operator shuts down the cementing system while waiting for a technician to explain a received code. In conventional systems, the operator may opt not to shut down the cementing system which can lead to bigger or more problems, which can result in more costly repairs.

Figure 1B:
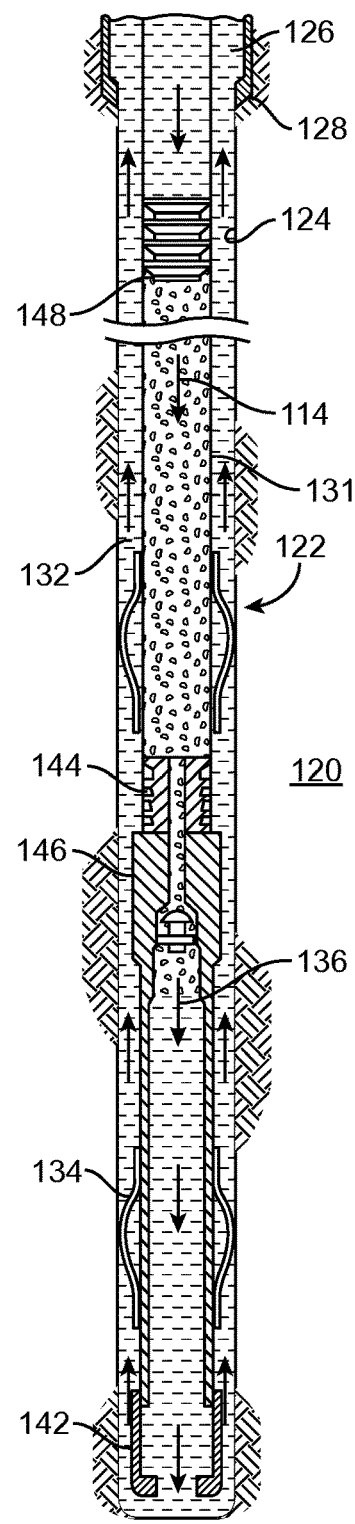
FIG. 1B is a sectional view of a cement composition in a wellbore annulus in accordance with an exemplary embodiment.

Referring to FIGS. 1A and 1B, an overview of a system for delivering a cement or fluid composition into a wellbore in accordance with an exemplary embodiment is illustrated. It should be noted that, while FIG. 1A generally depicts a sea-based operation, those skilled in the art will readily recognize that the principles described herein are equally applicable to land-based operations without departing from the scope of the disclosure. As shown, an off-shore oil or gas rig 110 can include a semi-submersible platform 113, centered over a submerged oil and gas formation (not shown) located below the sea floor 130, and a deck 115. A subsea conduit 118 extends from the deck 115 of the platform 113 to a wellhead installation 140, including one or more blowout preventers 150. The platform 113 can include a hoisting apparatus (not shown) and a derrick 160 for raising and lowering pipe strings. The off-shore oil or gas rig 110 can include a cementing system 200. The cementing system 200 can pump a cement or fluid composition 114 through a feed pipe 116 and to the subsea conduit 118 which conveys the cement or fluid composition 114 downhole. The fluid composition can be homogeneous or heterogeneous and be in the form of a fluid, slurry, dispersion, suspension, mixture or other similar compositional state wherein the components of the mixture or composition can be combined at varying ratios. The fluid composition can be drilling mud, fresh water, sea water, or base oil.

Referring to FIG. 1B, the cement or fluid composition 114 can be placed into a subterranean formation 120 in accordance with an exemplary embodiment. As shown, a wellbore 122 can be drilled into the subterranean formation 120. While wellbore 122 is shown extending generally vertically into the subterranean formation 120, the principles described herein are also applicable to wellbores that extend at an angle through the subterranean formation 120, such as horizontal and slanted wellbores. The wellbore 122 comprises walls 124. In the exemplary embodiments, a surface casing 126 has been inserted into the wellbore 122. The surface casing 126 can be cemented to the walls 124 of the wellbore 122 by cement sheath 128. In the exemplary embodiment, one or more additional conduits (e.g., intermediate casing, production casing, liners, etc.) shown as casing 131 can also be disposed in the wellbore 122. A wellbore annulus 132 is formed between the casing 131 and the walls 124 of the well bore 122 and/or the surface casing 126. One or more centralizers 134 can be attached to the casing 131, for example, to assist in centering the casing 131 in the wellbore 122 prior to and during the cementing operation.

The cement or fluid composition 114 can be pumped down the interior of the casing 131. The cement or fluid composition 114 can be allowed to flow down the interior of the casing 131 through a casing shoe 142 at the bottom of the casing 131 and up around the casing 131 into the wellbore annulus 132. The cement or fluid composition 114 can be allowed to set in the wellbore annulus 132, for example, to form the cement sheath 128 that supports and positions the casing 131 in the wellbore 122. While not illustrated, other techniques can also be utilized for introduction of the cement or fluid composition 114. By way of example, reverse circulation techniques can be used that include introducing the cement or fluid composition 114 into the subterranean formation 120 by way of the wellbore annulus 132 instead of through the casing 131.

As it is introduced, the cement or fluid composition 114 can displace other fluids 136, such as drilling fluids and/or spacer fluids, that may be present in the interior of the casing 131 and/or the wellbore annulus 132. At least a portion of the displaced fluids 136 can exit the wellbore annulus 132 via a flow line. Referring again to FIG. 1B, a bottom plug 144 can be introduced into the wellbore 122 ahead of the cement or fluid composition 114, for example, to separate the cement or fluid composition 114 from the fluids 136 that may be inside the casing 131 prior to cementing. After the bottom plug 144 reaches a landing collar 146, a diaphragm or other suitable device ruptures to allow the cement or fluid composition 114 through the bottom plug 144. In FIG. 1B, the bottom plug 144 is shown on the landing collar 146. In the exemplary embodiment, a top plug 148 can be introduced into the wellbore 122 behind the cement or fluid composition 114. The top plug 148 can separate the cement or fluid composition 114 from a displacement fluid and push the cement or fluid composition 114 through the bottom plug 144.

Figure 2:
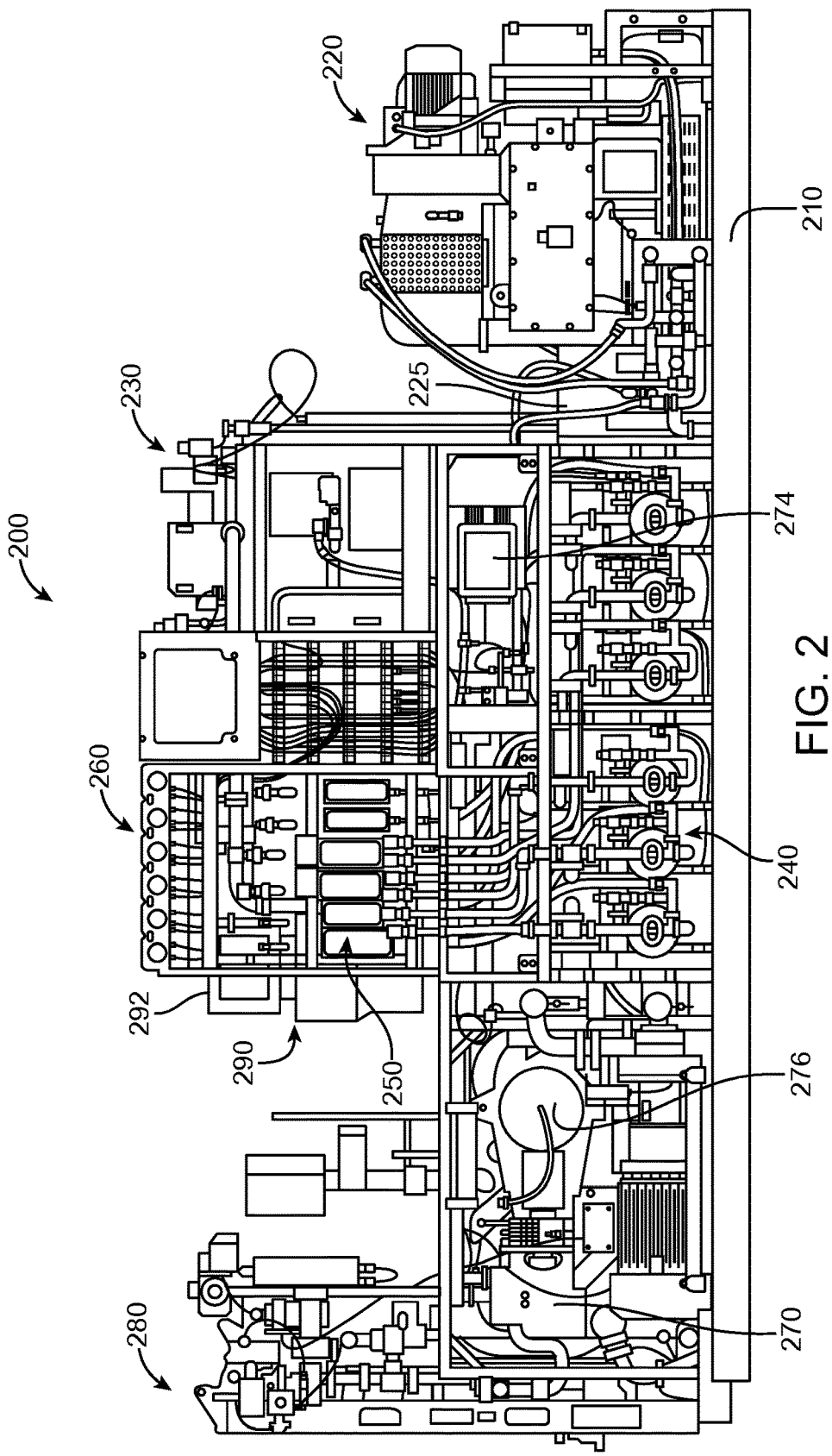
FIG. 2 is a perspective view of an off-shore skid-mounted cementing system in accordance with an exemplary embodiment.

Referring to FIG. 2, a perspective diagram of an off-shore skid-mounted cementing system in accordance with an exemplary embodiment is illustrated. A skid-mounted cementing system 200 can be coupled with a hydrocarbon producing rig and configured to inject a fluid composition or slurry, such as a cement composition, into a wellbore at variable degrees of pressure. Components of the skid-mounted cementing system 200, as described below, can be coupled with a skid 210. The skid 210 can be permanently or temporarily immobilized on the surface of the rig 110 or deck 115. In the exemplary embodiment, the cementing system 200 is used in off-shore oil production operations and is therefore should be permanently or temporarily immobilized on the surface of the rig 110 or deck 115. Alternatively, the skid-mounted cementing system 200 can be used in land-based oil production operations. In land-based operations, the skid-mounted cementing system 200 can be permanently or temporarily immobilized on the surface of a land-based rig, or adjacent or in substantially close proximity to the rig on a ground surface. The skid 210 can be one continuous piece of suitable weight bearing material, such as steel. Alternatively the skid 210 can be made up of a plurality of couplable sections. When the skid 210 is made up a plurality of couplable sections, each section can correspond to one or more components of the cementing system 200. The couplable sections, each with one or more components of the cementing system 200 coupled thereto, and components of the cementing system 200 can be assembled on-site or during manufacturing of the cementing system 200. In land-based operations, the cementing system 200 can be mounted on or coupled with a vehicle. The vehicle can be, for example, a truck. The cementing system 200 can be mounted on or coupled with the vehicle via skid 210. Alternatively, the cementing system 200 can be directly mounted on or coupled with the vehicle without the skid 210.

The cementing system 200 can include a power source 220, a fluid mixing system 230, a plurality of liquid additive pumps 240, a plurality of flow meters 250, a plurality of data transmitters 260, a high pressure fluid pump system 270, a high pressure discharge manifold 280, and a programmable logic controller (PLC) 290. The power source 220 can include one or more electric or gas powered motors which are directly or indirectly coupled with various components of the cementing system 200 via a drive shaft 225, which translates power from the power source 220 to the various components. The fluid mixing system 230 can have a water tank (not shown), for storage of water and/or other fluids, and mixing tank (not shown) in which water, fluids, dry cementing mix and other materials can be mixed to form the cement or fluid composition. The fluid mixing system 230 can be coupled with the PLC 290 to monitor the amount of water or other materials therein, to control the rate of mixing in the mixing tank, test the functioning of the fluid mixing system, and perform other functions related to the fluid mixing system 230.

Liquid additives stored in storage vessels (not shown) can be added to the mixing tank via one or more of the plurality of liquid additive pumps 240. Each liquid additive pump 240 can be coupled with a corresponding storage vessel containing a distinct additive or mixture of additives. The output flow of the liquid additives from the each liquid additive pump 240 can be monitored by a corresponding one of the plurality of flow meters 250. Each flow meter 250 is coupled with a corresponding one of the plurality of data transmitters 260. The plurality of data transmitters 260 are coupled with the PLC 290 and transmit flow output data from the flow meters 250 to the PLC 290. The PLC 290 can control and monitor the rate of additive addition to the mixing tank, test the functioning of the liquid additive pumps 240, and perform other functions related to the movement of the liquid additives.

The high pressure fluid pump system 270 can include a large volume displacement system having a large volume pump 276, which may also be a large volume high pressure pump. The power source 220 actuates the large volume pump 276 via the drive shaft 225 to pump fluid. The large volume pump 276 can have a pump rate ranging from to 50 to 1200 gallons per minute ("gpm"), alternatively 150 to 1000 gpm, and alternatively 250 to 850 gpm. The large volume pump 276 can be configured to increase fluid pressure at continuously or incrementally increasing rates which can be controlled by the PLC 290 in response to a pressure setting input by a user via a graphical user interface 292.

The high pressure fluid pump system 270 includes a low volume displacement system having a low volume pump (not shown), which may also be a low volume high pressure pump, and an electric motor 274. The electric motor 274 actuates the low volume pump to pump fluid. The low volume pump can have a pump rate of up to 1 gallon per minute ("gpm"), alternatively 2 gpm, alternatively 5 gpm, alternatively 10 gpm, alternatively 20 gpm, alternatively, 30 gpm, alternatively 40 gpm, and alternatively 50 gpm.

The large volume pump 276 can be configured to increase fluid pressure at continuously or incrementally increasing rates, which can be controlled by the PLC computer 290 in response to a pressure setting input by a user via the graphical user interface 292. The power source 220 will displace increasing power to the large volume pump 276 via drive shaft 225, in response to the inputted pressure setting which, in turn, actuates the large volume pump 276 to cause an increase in fluid pressure. When the large volume pump 276 is configured to increase fluid pressure at an incrementally increasing rate, the rate can be larger than the rate of the low volume pump. When the large volume pump 276 is configured to increase fluid pressure at a continuously increasing rate, the rate can be larger than the rate of the low volume pump.

The cement or fluid composition 114 one or more of fresh or salt water, cement mix, additives, or other fluids can be sent to the large volume pump 276 and the low volume pump from the mixing tank. The large volume pump 276 and low volume pump are coupled with the high pressure discharge manifold 280 and pump the fluid composition at a predetermined pressure to the high pressure discharge manifold 280. The high pressure discharge manifold 280 is coupled with the feed pipe 116 of the off-shore oil or gas rig 110 for injection into the wellbore. The high pressure fluid pump system 270 can be communicatively coupled with the PLC 290. The functioning of the high pressure fluid pump system 270 can be monitored, controlled and tested by the PLC 290.

The PLC 290 can include one or more graphical user interfaces (GUIs) 292 for monitoring the functions of an engine and transmission notification system of the cementing system 200 described above. One or more of the GUIs 292 can display one or more monitoring and controlling options of a single component or multiple components of the cementing system 200. As explained below the PLC 290 can display a GUI for an engine and transmission notification system.

Figure 3:
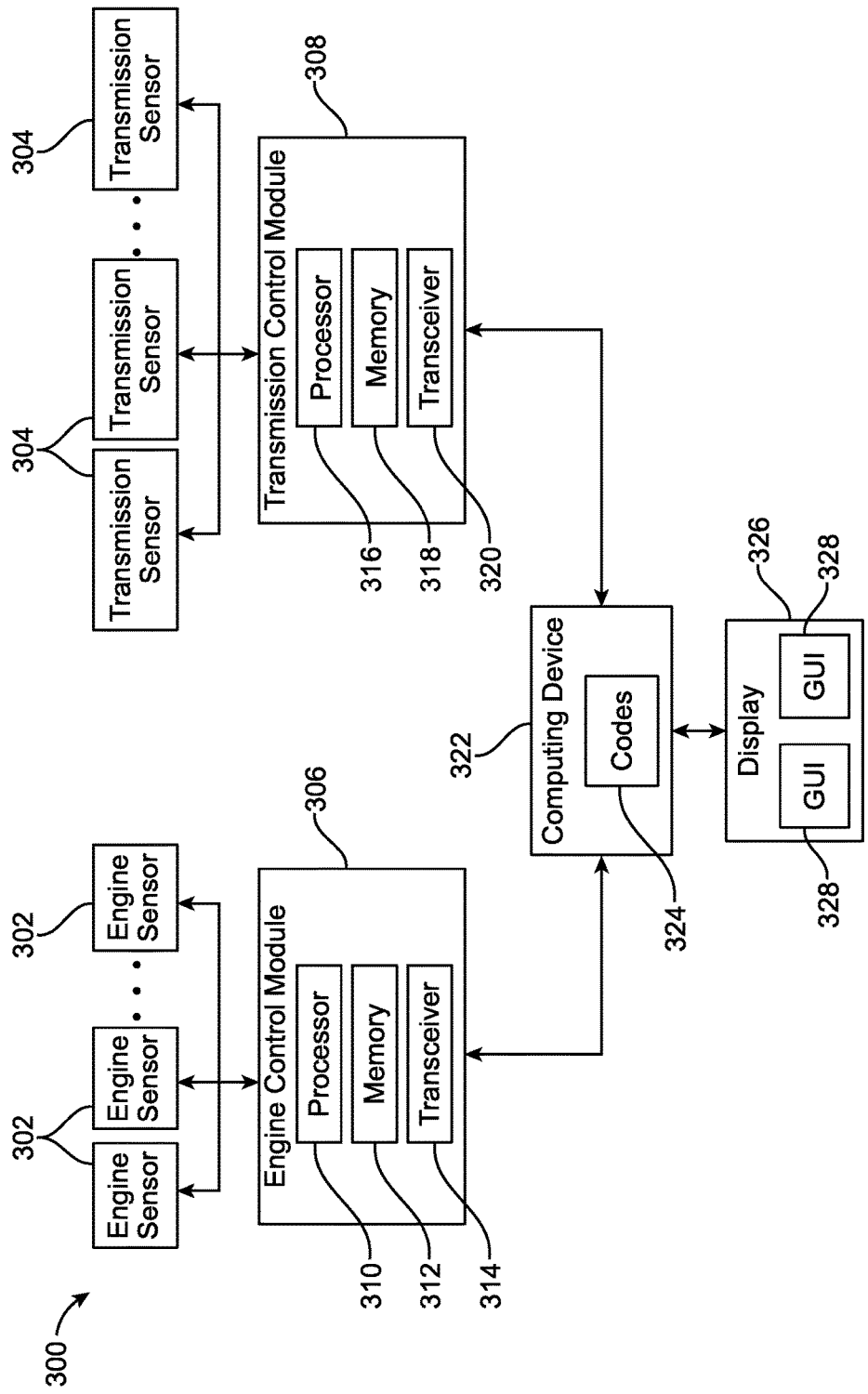
FIG. 3 is a block diagram of an engine and transmission notification system in accordance with an exemplary embodiment.

Referring to FIG. 3, a block diagram of an engine and transmission notification system in accordance with an exemplary embodiment is illustrated. As shown, the engine and transmission notification system 300 can include a plurality of engine sensors 302, a plurality of transmission sensors 304, an engine control module 306, a transmission control module 308, a processor 322 and a display 326. The engine sensors 302 are located within the engine of the cementing skid 200 as known in the art. Each of the engine sensors 302 are communicatively coupled with the engine control module 306. Each of the engine sensors 302 can provide engine sensor data to the engine control module 306 via hardwiring, wirelessly or can be communicatively coupled with the engine control module via a J1939 data link. For wireless transmission of data, each engine sensor 302 can include a corresponding transceiver (not shown) to transmit the engine sensor data to the engine control module 306. The engine control module 306 can be a device as known in the art, such as a metal box.

The engine control module 306 can be a device including a processor 310, a memory 312 and a transceiver 314. The processor 310 can receive the engine sensor data via the transceiver 314. The received engine sensor data can be from one or more of the engine sensors 302. The processor 310 can compare each of the received engine sensor data with one or more corresponding ranges. The ranges can be a normal operating range and/or one or more abnormal operating ranges which are stored in the memory 312. For example, the abnormal operating ranges can be a warning range, an alarm range and a shutdown range. Based on the comparison, the processor 310 can cause the transceiver 314 to transmit the received engine sensor data and/or one or more engine codes, such as a diagnostic trouble code or codes, when the received engine sensor data falls outside of the normal operating range or that falls within an abnormal operating range. For example, if the received sensor data is for the engine oil pressure, the engine control module 306 would compare the received engine oil pressure with one or more operating ranges corresponding to engine oil pressure. The one or more operating ranges can include a normal range which can be from about 35-45 pounds, a warning range which can be from about 30-34 pounds, an alarm range which can be from about 20-29 pounds and a shutdown range which can be from about 0-29 pounds. Alternatively, if the received engine sensor data falls within the normal operating range, then no transmission is sent.

The transmission sensors 304 are located within the transmission of the cementing skid 200 as known in the art. The transmission sensors 304 are located within the transmission of the cementing skid 200 as known in the art. Each of the transmission sensors 304 are communicatively coupled with the transmission control module 308. Each of the transmission sensors 304 can provide transmission sensor data to the transmission control module 308 via hardwiring, wirelessly or can be communicatively coupled with the engine control module via a J1939 data link. For wireless transmission of data, each transmission sensor 304 can include a corresponding transceiver (not shown) to transmit the sensor data to the transmission control module 308. The transmission control module 306 can be a device as known in the art, such as a metal box. The engine control module 306 can include a processor 316, a memory 318 and a transceiver 320. For values that fall within the shutdown range, the engine control module 306 can send a shutdown command. The shutdown command can shut down the skid-mounted cementing system 200.

The transmission control module 308 can be a device including a processor 316, a memory 318 and a transceiver 320. The processor 316 can receive the transmission sensor data via the transceiver 320. The received transmission sensor data can be from one or more of the transmission sensors 304. The processor 316 can compare each of the received transmission sensor data with one or more corresponding ranges. The ranges can be a normal operating range and/or one or more abnormal operating ranges which are stored in the memory 318. For example, the abnormal operating ranges can be a warning range, an alarm range and a shutdown range. Based on the comparison, the processor 316 can cause the transceiver 320 to transmit the received transmission sensor data and/or one or more transmission codes, such as a diagnostic trouble code or codes, when the received transmission sensor data falls outside of the normal operating range or that falls within an abnormal operating range. For example, if the received sensor data is for the transmission oil temperature, the transmission control module 308 would compare the received transmission oil temperature with one or more operating ranges corresponding to transmission oil temperature. The one or more operating ranges can include a normal range which can be from about 175-190 degrees Fahrenheit (F), a first warning range which can be from about 165-174 degrees F., a second warning range which can be from about 191-200 degrees F. and a first alarm range which can be from about 0-164 degrees F. and a second alarm range which can be from about 201-210 degrees F. Alternatively, if the received transmission sensor data is in the normal operating range, then no transmission is sent. For values that fall within the shutdown range, the transmission control module 308 can send a shutdown command. The shutdown command can shut down the skid-mounted cementing system 200.

A computing device 322 is communicatively coupled with the engine control module 306 and the transmission control module 308. The computing device 322 is communicatively coupled with the display 326. The engine control module 306 can send engine sensor data to the computing device 322. The engine sensor data can include engine data and/or one or more diagnostic trouble codes. The transmission control module 308 can send transmission sensor data to the computing device 322. The transmission sensor data can include transmission sensor data and/or one or more diagnostic trouble codes. The computing device 322 can process the received data, e.g., the engine sensor data and/or the transmission sensor data, and/or one or more diagnostic trouble codes. For example, the computing device 322 can compare each of the received diagnostic trouble codes with one or more lists of diagnostic trouble codes or codes 324 stored in memory (not shown) of the computing device 322. When the received sensor data includes one or more diagnostic trouble codes which match one or more of codes in the one or more lists of diagnostic trouble codes, the computing device 322 can cause each of the diagnostic trouble codes, along with a description or explanation, to be displayed via a graphical user interface (GUI) 328 on the display 326. The computing device 322 can also display engine and transmission information via the GUI 328. The information can be received from the engine sensors and transmission sensors. For example, the computing device 322 can display the engine information and transmission information as shown in FIGS. 11A-11D.

Figure 13:
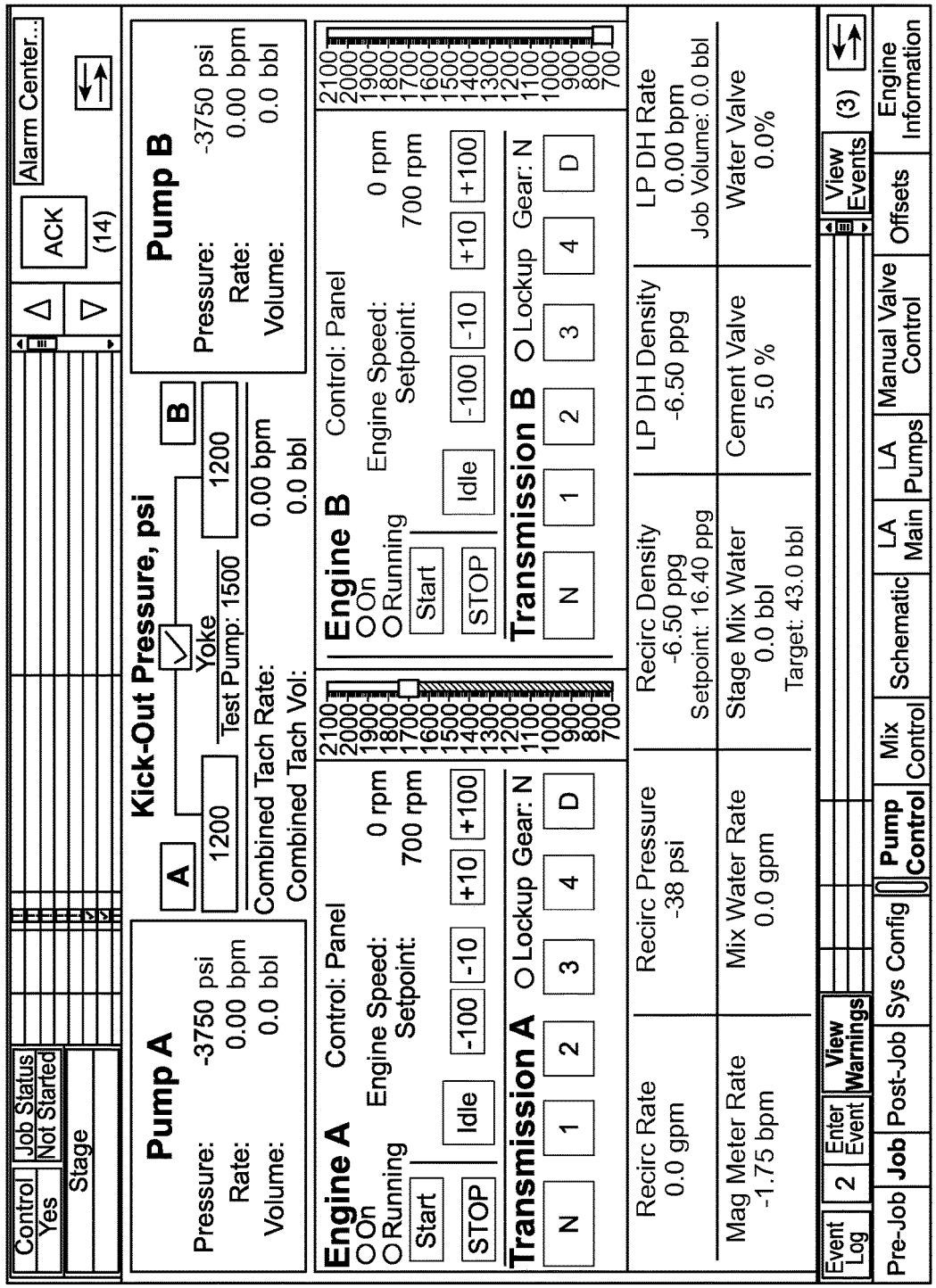
FIG. 13 is a screenshot of a GUI for entering engine rpm set points and requested gears in accordance with an exemplary embodiment.
Figure 14:
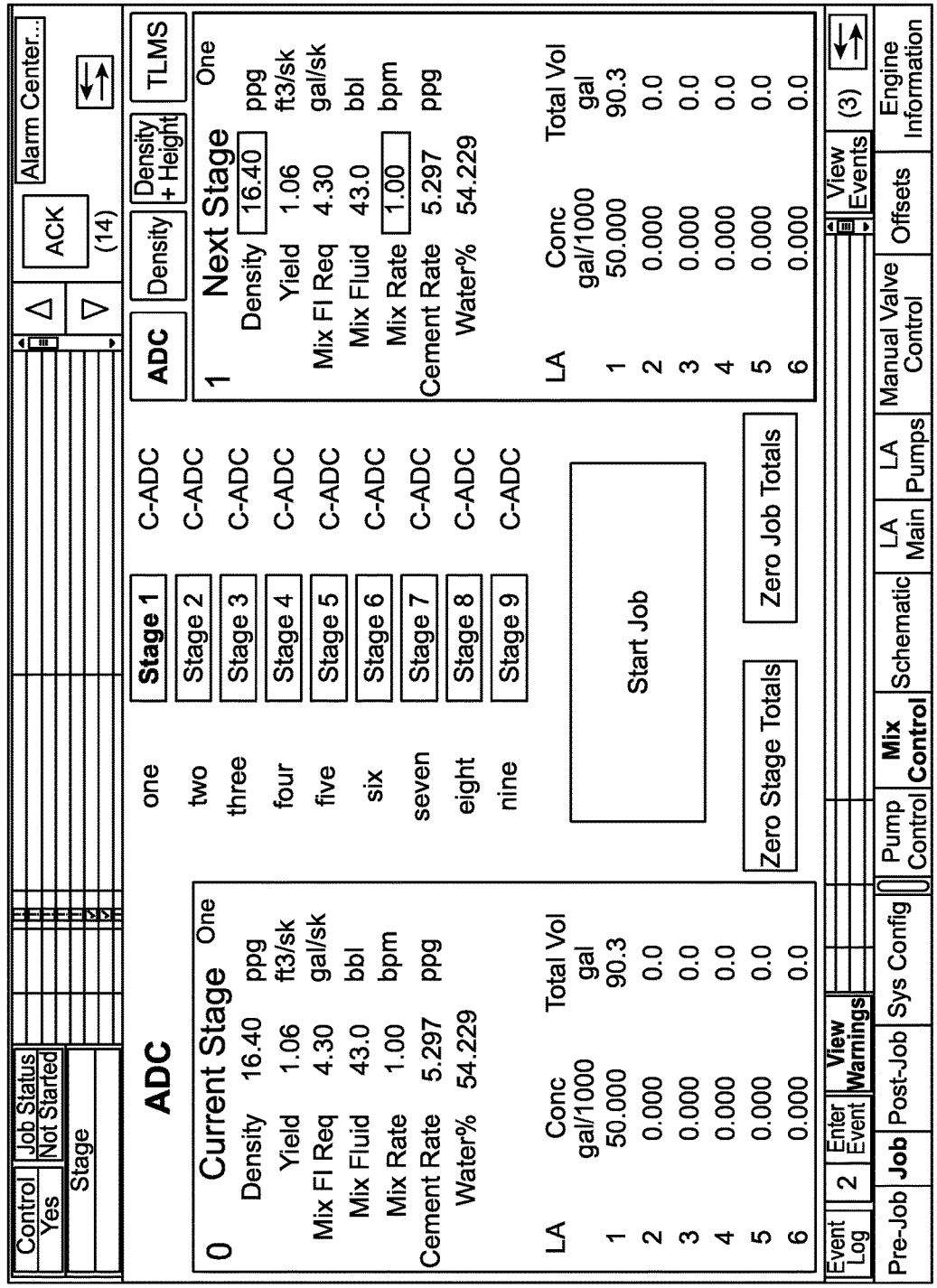
FIG. 14 is a screenshot of a GUI for entering mixing values in accordance with an exemplary embodiment.

The computing device 322 can send requested gear and engine set points to the engine control module 306 and transmission control module 308 that are entered via the GUI 328 rendered on the display 326. For example, FIG. 13 is a screenshot for a GUI for entering engine rpm set points and requested gears in accordance with an exemplary embodiment. As shown the engine rpm set point is 700 rpm and the gear is third gear. The computing device 322 sends the engine rpm to the engine control module 306 and sends the requested gear to the transmission control module 308, respectively. The engine control module 306 sends the engine rpm to an engine controller to adjust the engine rpms. The transmission control module 308 sends the gear request to a transmission controller to change gears. The computing device 322 can display a GUI 328 for entering or adjusting mixing values as shown in FIG. 14.

Referring to FIGS. 4A-4C, 5 and 6A-6D, lists of engine codes, transmission diagnostic trouble codes (DTC) and transmission codes, respectively, in accordance with exemplary embodiments are illustrated. The codes can include, but are not limited to, both the FMI and SPN list numeric values and the DTC onboard diagnostic Parameter Group Number code list. The codes are typically in ASCII text format. Alternatively, the codes can be in other test formats known in the industry. Codes beginning with P are for powertrain. Codes beginning with U are network related. Codes of P1000 or greater are manufacturer specific. Equipment suppliers can add or replace the codes. The lists of engine codes and transmission codes can be in one list, separate lists, in multiple lists or combined in multiple lists. As shown, each code can be a diagnostic trouble code (DTC) and can include a suspect parameter number (SPN), a failure mode identifier (FMI) and an associated description or explanation. For example, the first DTC engine code has a SPN of 91, a FMI of 13 and a description of throttle position calibration required. The codes can include one or more of the codes listed in FIGS. 10A-10B. Alternatively, the codes can be and/or include other codes known in the industry.

Figure 7:
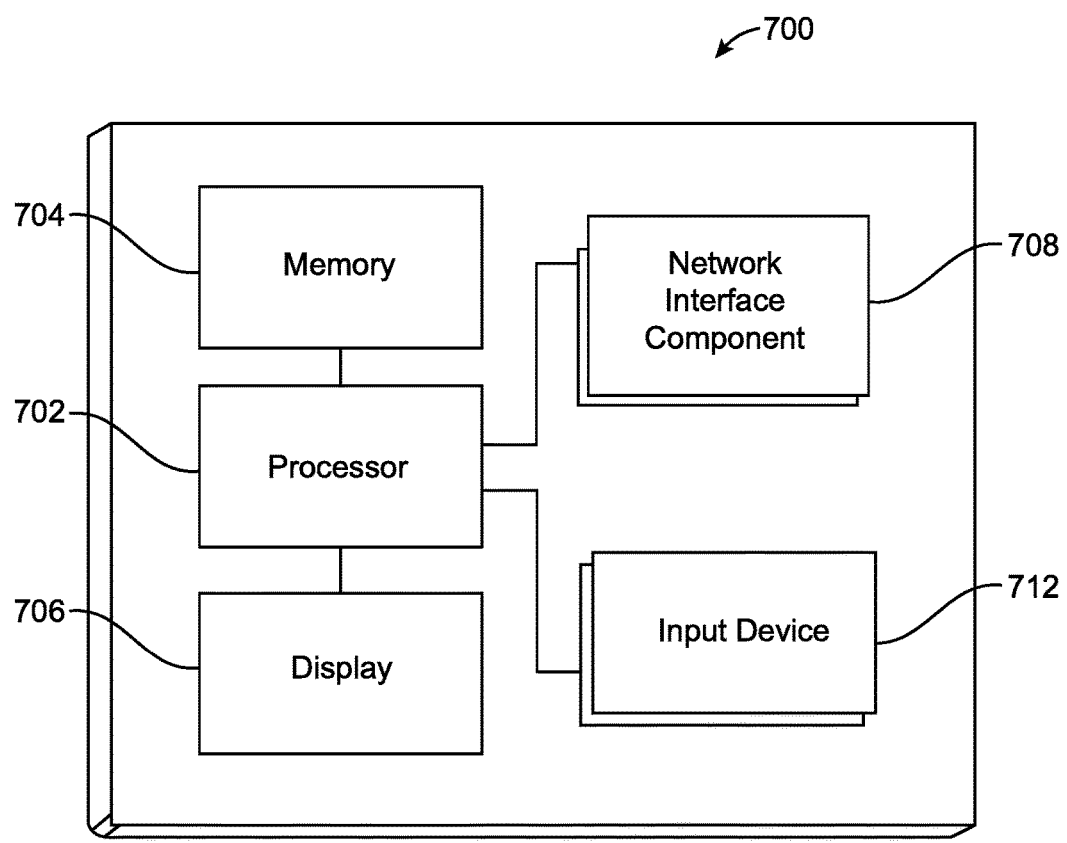
FIG. 7 is a block diagram of a computing device in accordance with an exemplary embodiment.

Referring to FIG. 7, a block diagram of a computing device in accordance with an exemplary embodiment is illustrated. The computing device 700 can be the programmable logic controller (PLC) 290 described above. A PLC can be an industrial computer control system that continuously monitors the state of input devices (e.g., one or more receivers or transceivers configured to receive data from the engine control module 306 and data from the transmission control module 308) and makes decision based upon a program to control the state of one or more output devices (e.g., the GUIs 328 on the display 326). As such the PLC 290 is a dedicated computing device. In one or more embodiments, the computing device 700 can be a computer. In this example, the computing device 700 includes a processor or central processing unit (CPU) 702 for executing instructions that can be stored in a memory 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display 706, such as a touch screen or liquid crystal display (LCD), although devices such as portable media players might convey information via other means, such as through audio speakers. The display 706 can be part of the computing device 700 as shown. Alternatively, the display 706 can be communicatively coupled with the computing device 700 as shown in FIG. 3. The computing device 700 in one or more embodiments can include at least one input device 712 able to receive conventional input from a user. This conventional input can include, for example, a push button, touch pad, touch screen, keyboard, mouse, keypad, or any other such device or element whereby a user can input a command to the device. In one or more embodiments, the computing device 700 of FIG. 7 can include one or more network interface components 708 for communicating over various networks, such as a Wi-Fi, Bluetooth, RF, wired, or wireless communication systems. The device in many embodiments can communicate with a network, such as the Internet, and may be able to communicate with other such devices.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the computing devices are known or commercially available and are readily implemented by persons having ordinary skill in the art, particularly in light of the disclosure herein.

Any necessary files for performing the functions attributed to the computing devices 700 can be stored locally and/or remotely, as appropriate. Where a system includes computing devices 700, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

Figure 8:
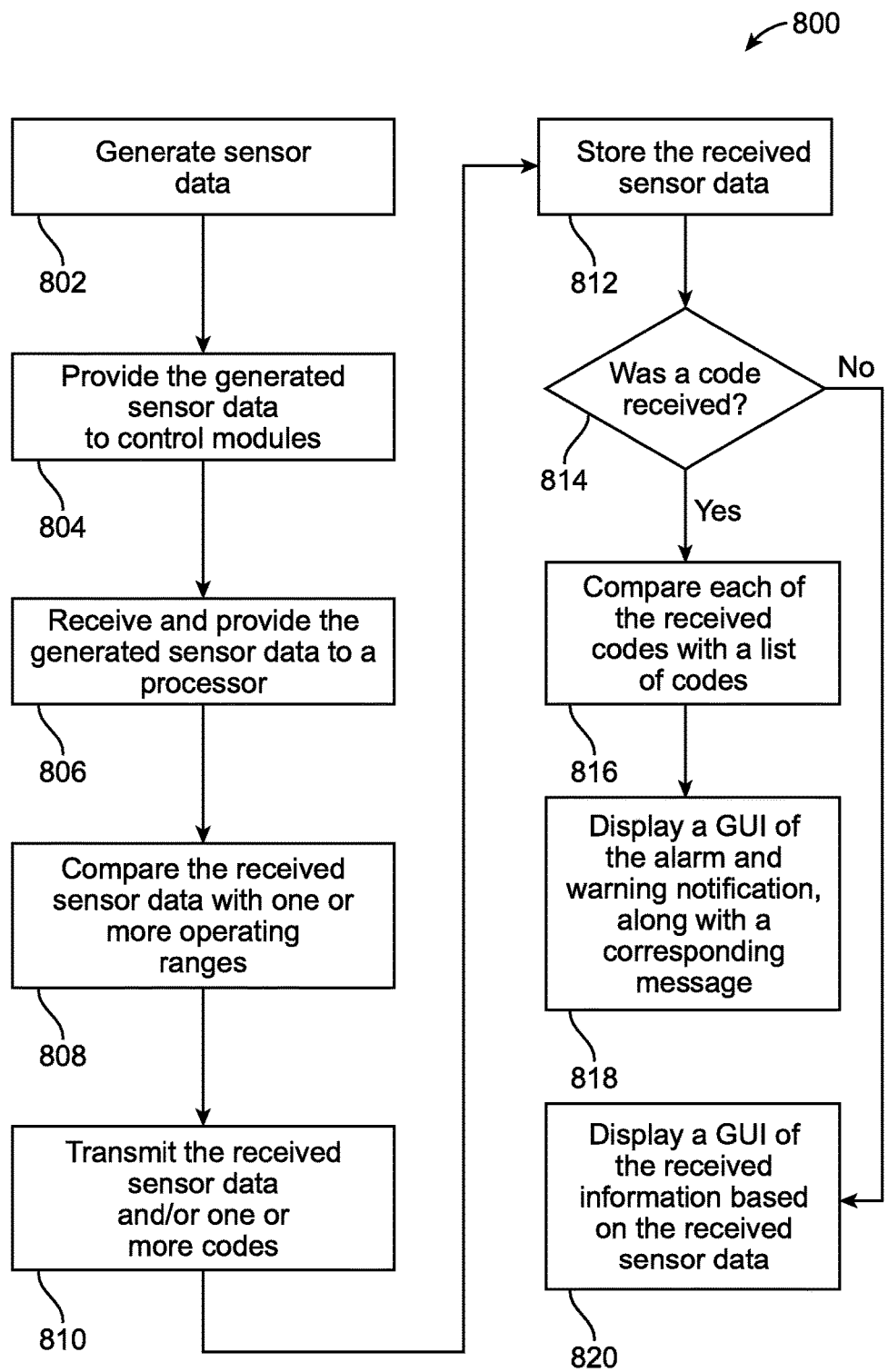
FIG. 8 is a flowchart for a method for displaying notification messages in accordance with an exemplary embodiment.

Referring to FIG. 8, a flowchart for a method for displaying notifications in accordance with an exemplary embodiment is illustrated. The exemplary method 800 is provided by way of example, as there are a variety of ways to carry out the method. The method 800 described below can be carried out using the configurations illustrated in FIGS. 1-7 by way of example, and various elements of this figure are referenced in explaining exemplary method 800. Each block shown in FIG. 8 represents one or more processes, methods or subroutines, carried out in the exemplary method 800. The exemplary method 800 can begin at block 802.

At block 802, sensor data is generated. For example, the engine sensors 302 and transmission sensors 304 can generate sensor data. The generated sensor data can include engine sensor data and transmission sensor data. The generation of the sensor data can be in response to the sensors 302, 304 continuously monitoring the functionality of the engine and transmission, respectively. Alternatively, the generation of the sensor data can be in response to commands from a control module, e.g., the engine control module 306 and/or the transmission control module 308. After generating the sensor data, the method 800 can proceed to block 804.

At block 804, the generated sensor data is provided to the control modules. For example, the engine sensors 302 can provide, or transmit, the engine sensor data to the engine control module 306 and the transmission sensors 304 can provide, or transmit, the transmission sensor data to the transmission control module 308. After providing the generated sensor data to the control modules, the method 800 can proceed to block 806.

At block 806, the generated sensor data is received and provided to a processor. For example, the transceiver 314 of the engine control module 306 receives the generated engine sensor data and provides the received engine sensor data to the processor of the engine control module 306 and the transceiver 320 of the transmission control module 308 receives the generated transmission sensor data and provides received transmission sensor data to the processor 316 of the transmission control module 308. After receiving the generated sensor data, the method 800 can proceed to block 808.

At block 808, the received sensor data is compared with one or more operating ranges. For example, the processor 310 of the engine control module 306 compares the received engine sensor data with one or more operating ranges and the processor 316 of the transmission control module 308 compares each of the received transmission sensor data with one or more corresponding operating ranges. The comparison can be with only the normal operating range. The one or more operating ranges are stored in the memory, such as memory 312 of the engine control module 306 and memory 318 of the transmission control module 308. The operating ranges can be a normal operating range and/or one or more abnormal operating ranges. The abnormal operating ranges can include, but are not limited to, a warning range, an alarm range and a shutdown range. For example, if the received engine sensor data is for the engine oil pressure, the processor 310 of the engine control module 306 compares the engine oil pressure with one or more operating ranges for the engine oil pressure. For example, the one or more engine oil pressure operating ranges can include a normal range which can be from about 35-45 pounds, a warning range which can be from about 30-34 pounds, an alarm range which can be from about 20-29 pounds and a shutdown range which can be from about 0-29 pounds. In another example, if the received sensor data is for the transmission oil temperature, the processor 316 of the transmission control module 308 compares the transmission oil temperature with one or more transmission oil temperature operating ranges. For example, the one or more transmission oil temperature operating ranges can include a normal range which can be from about 175-190 degrees Fahrenheit (F), a first warning range which can be from about 165-174 degrees F., a second warning range which can be from about 191-200 degrees F., a first alarm range which can be from about 0-164 degrees F. and a second alarm range which can be from about 201-210 degrees F. Each of the abnormal ranges can be associated with a code, such as a diagnostic trouble code (DTC). For values that fall within one or more of the shutdown ranges, the engine control module 306 or transmission control module 308 can send a shutdown command to cause an automatic shutdown of the skid-mounted cementing system 200. After comparing the received sensor data with the one or more operating ranges, the method 800 can proceed to block 810.

At block 810, the received sensor data and/or one or more codes are transmitted. For example, the processor 310, 316 can cause the transceiver 314, 320 to transmit the received sensor data and/or one or more codes, such as diagnostic trouble codes, to the computing device 322. If the received sensor data falls within the normal operating range, then only the received sensor data is transmitted. If the received sensor data is not within the normal operating code, then the received sensor data and the associated code is transmitted. After transmitting the received sensor data and/or one or more codes, the method 800 can proceed to block 812.

At block 812, the received sensor data is stored. For example, the processor of the computing device can store the received sensor data in the memory of the computing device. After storing the received sensor data, the method 800 can proceed to block 814.

At block 814, a determination is made whether a code was received. For example, the computing device determines if the received transmission from the control module, e.g., the engine control module 306 or the transmission control module 308 contains one or more codes. If one or more codes are received the method 800 can proceed to block 816. If no code is received, the method 800 can proceed to block 820.

At block 816, each of the received codes is compared with a list of codes. For example, the computing device can compare each of the received codes, e.g., each DTC, with a list of codes stored in the memory of the computing device. The list of codes can be a single list. The single list can include the DTCs shown in FIGS. 9A-9F. Alternatively, a plurality of lists of codes can be used with the list of codes stored in the memory of the computing device. The plurality of lists can be the lists shown in FIGS. 4A-4C, 5 and 6A-6D. After comparing the received code, the method 800 can proceed to block 818.

Figure 11B:
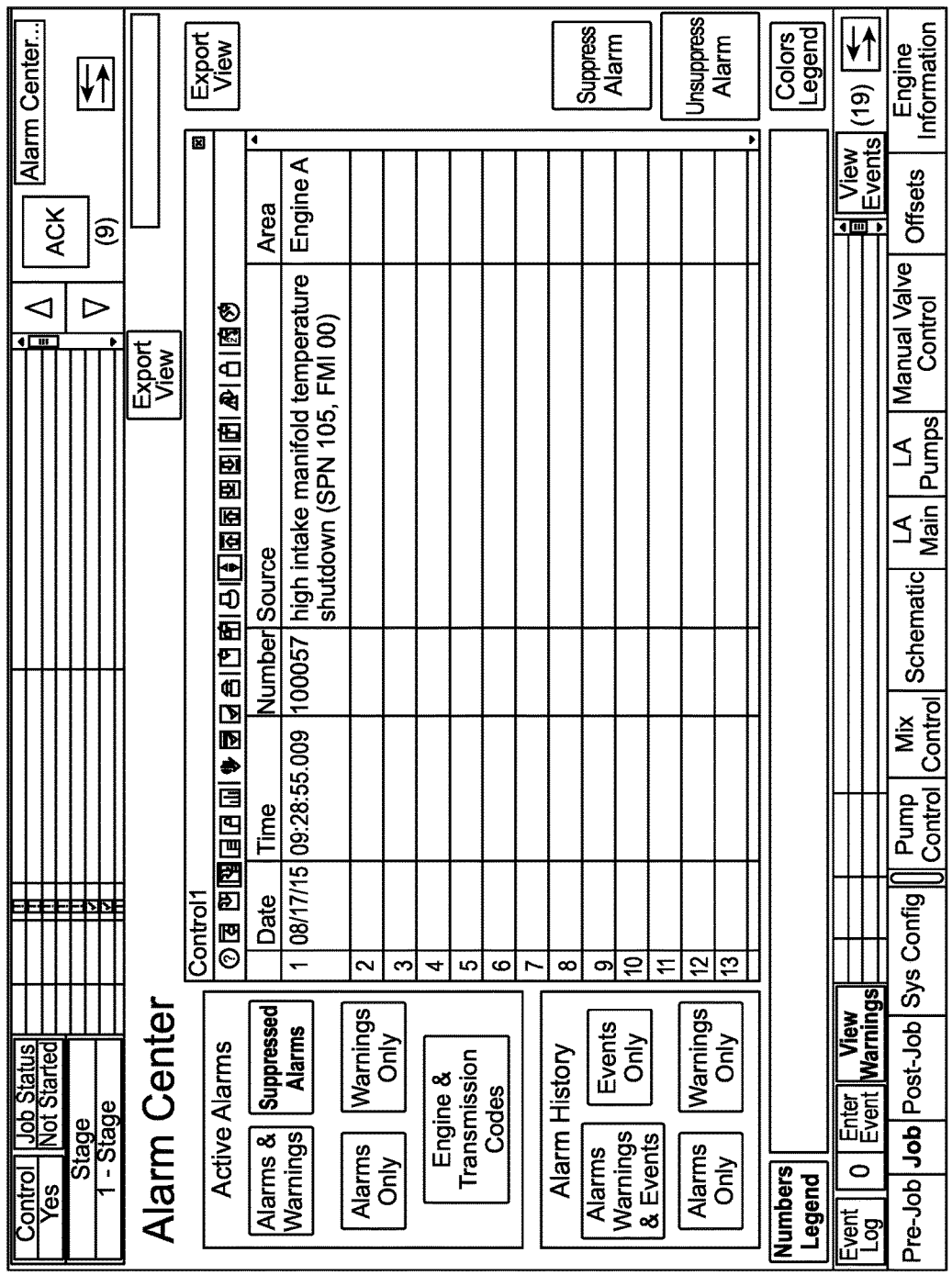
Figure 11C:
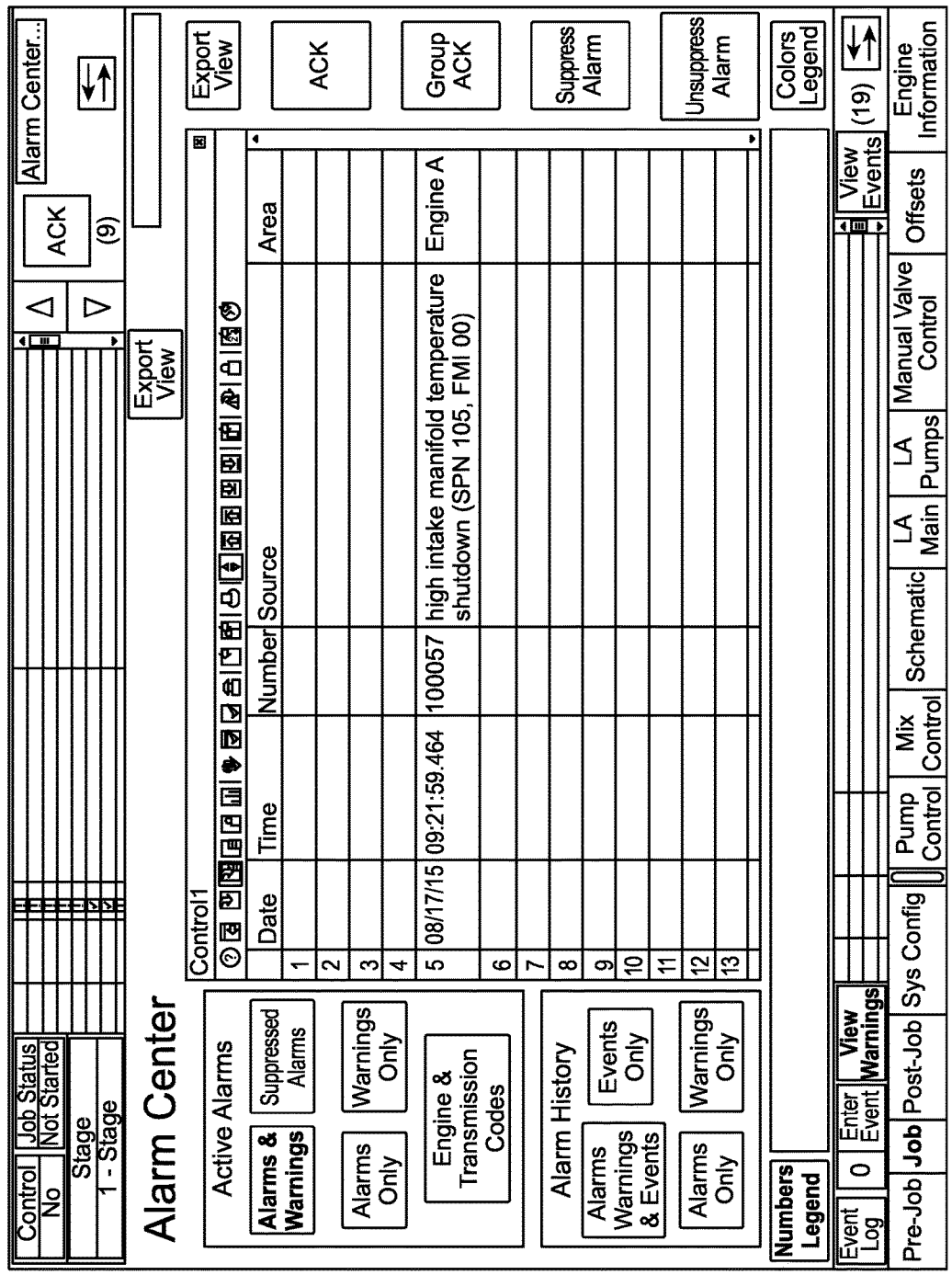
Figure 11D:
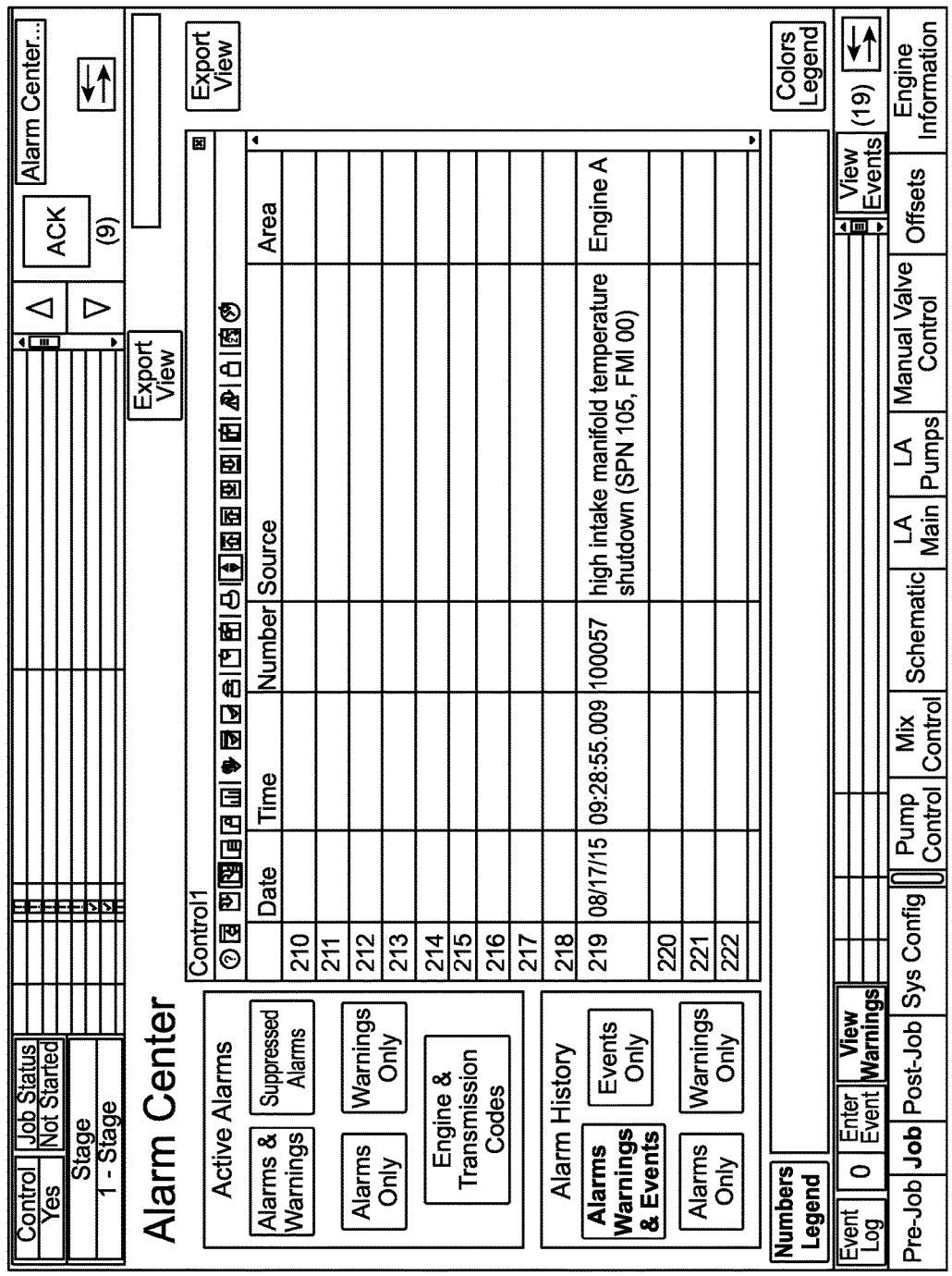

At block 818, a GUI displaying the alarm or warning notifications, along with a corresponding message, for each of the matched codes is displayed. For example, the computing device 322 can cause a GUI to be displayed along with the alarm or warning notifications for the engine and transmission codes, along with a message explaining the alarm or warning, for each of the matched code is displayed. For example, FIG. 11A shows a screenshot of the alarms and warnings for the engine and transmission codes in accordance with an exemplary embodiment. As shown, the first code was received on Aug. 6, 2015 at 13:44:30.864, having number 1000000, the description is "High Auxiliary Pressure Shutdown (SPN 1387, FMI 000)" which occurred in Engine A. The last code was received on Aug. 6, 2015 at 13:56:06.862, having number 1000032, the description is "secondary engine speed signal abnormal (SPN 723, FMI 08)" which occurred in Engine A. Additionally, shown in FIG. 11B is a suppressed alarm, which show a code was received on Aug. 17, 2015 at 09:28:55.009, having number 100057, with the description "High Intake Manifold Temperature Shutdown (SPN 105, FMI 00)" which occurred in Engine A. Additionally shown in FIG. 11C is a screen shot of active alarms "alarms and warning," which can list all active alarms and warnings, and thus also illustrates the code shown in FIG. 11B, and/or list other codes, alarms and warnings. The Alarm history as shown in FIG. 11D can also list the same code shown in FIGS. 11B and 11C, or list other codes, alarms and warnings. In response to the display of the GUI displaying the alarm or warning, the operator can take action. For example, the operator or a technician can shut down the cementing system, remedy the issue, monitor the situation, and/or do nothing. In another example, the operator can shut down the engine by pressing a stop button on the displayed GUI and a shutdown message can be sent to the engine control module 306.

At block 820, a GUI displaying engine information based on the received engine sensor data is displayed. For example, the computing device 322 can cause a GUI to be displayed along with the engine information. For example, FIG. 12 shows a screenshot of the engine information for Engine A and Engine B displayed in a GUI in accordance with an exemplary embodiment. As shown, the oil pressure, fuel pressure, coolant temperature, fuel cooler hydraulic pressure, total hours, exhaust gas temperature, battery voltage and transmission oil temperature for each engine is displayed. The computing device 322 can display other GUIs as shown in FIGS. 11 and 12.

The embodiments shown and described above are only examples. Therefore, many details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims.

Statements of the Disclosure Include:

Statement 1: An engine and transmission notification system comprising: an engine control module communicatively coupled with a plurality of engine sensors and configured to: receive engine sensor data from the plurality of engine sensors; and send a code in the event the received engine sensor data falls within one of one or more operating ranges; a transmission control module communicatively coupled with a plurality of transmission sensors and configured to: receive transmission sensor data from the plurality of transmission sensors; and send a code in the event the received transmission sensor data falls within one of one or more operating ranges; a display; and a computing device communicatively coupled with the display and communicatively coupled, via at least one J1939 data link, with the engine control module and the transmission control module, the processor configured to: receive a code from at least one of an engine control module or a transmission control module; compare the received code to a list of stored codes; and in response to the received code matching a stored code, causing the rendering of at least one of an alarm message associated with the matched code or a warning message associated with the matched code on the display.

Statement 2: The engine and transmission notification system according to Statement 1, wherein the alarm message comprises a code and a description associated with the code.

Statement 3: The engine and transmission notification system according to Statement 1, wherein the warning message comprises a code and a description associated with the code.

Statement 4: The engine and transmission notification system according to any of the Statements 1-3, wherein the codes are diagnostic trouble codes (DTC) which further comprise suspect parameter numbers and failure mode identifiers.

Statement 5: The engine and transmission notification system according to any of the Statements 1-4, wherein the rendering of at least one of an alarm message associated with the matched code or a warning message associated with the matched code on the display further comprises rendering a list of alarm messages and warning messages for each of matched codes.

Statement 6: The engine and transmission notification system according to any of the Statements 1-4, wherein the rendering of at least one of an alarm message associated with the matched code or a warning message associated with the matched code on the display further comprises further comprises rendering a list of alarm messages with each alarm message including an alarm number, date, time, alarm code, source and area.

Statement 7: The engine and transmission notification system according to any of the Statements 1-6, wherein the one or more operating ranges is a normal operating range.

Statement 8: The engine and transmission notification system according to any of the Statements 1-6, wherein the one or more operating ranges comprises an abnormal operating range.

Statement 9: The engine and transmission notification system according to any of the Statements 1-8, wherein the memory comprises a single list of codes.

Statement 10: The engine and transmission notification system according to any of the Statements 1-9, wherein the engine and transmission system resides on a cementing skid.

Statement 11: The engine and transmission notification system according to any of the Statements 1-9, wherein the engine and transmission system resides on a cementing truck.

Statement 12: The engine and transmission notification system according to any of the Statements 1-11, wherein the plurality of engine sensors and the plurality of transmission sensors are continuously monitored.

Statement 13: The engine and transmission notification system according to any of the Statements 1-12, wherein the rendering of at least one of an alarm message associated with the matched code or a warning message associated with the matched code on the display via a graphical user interface (GUI).

Statement 14: The engine and transmission notification system according to Statement 13, wherein the computing device is a programmable logic controller.

Statement 15: A method comprising: receiving, via a J1939 gateway of a cementing system, data from at least one of an engine control module or a transmission control module; comparing the received data to a list of stored codes; in response to the received data matching a stored code, causing the rendering of at least one of an alarm message associated with the matched code or a warning message associated with the matched code.

Statement 16: The method of Statement 15, wherein the rendering further comprises rendering a list of alarm messages.

Statement 17: The method of Statement 16, wherein the displaying further comprises displaying a list of alarm messages with each alarm message including an alarm number, date, time, alarm code, source and area.

Statement 18: The method of any of the Statements 15-17, wherein the received data is from a plurality of engine sensors and a plurality of transmission sensors.

Statement 19: The method of any of the Statement 15-18, wherein the receiving, comparing and causing is performed by a computing device.

Statement 20: The method of Statement 19, wherein the computing device is a programmable logic controller.

What is claimed is:

1. An engine and transmission notification system comprising:
  an engine control module communicatively coupled with a plurality of engine sensors and configured to:
    receive engine sensor data from the plurality of engine sensors; and
    send a code in the event the received engine sensor data falls within one of one or more predetermined abnormal operating ranges or outside a predetermined normal operating range;
  a transmission control module communicatively coupled with a plurality of transmission sensors and configured to:
    receive transmission sensor data from the plurality of transmission sensors; and
    send a code in the event the received transmission sensor data falls within one of one or more predetermined abnormal operating ranges or outside a predetermined normal operating range; a display; and
  a computing device communicatively coupled with the display and communicatively coupled, via at least one J1939 data link, with the engine control module and the transmission control module, the computing device configured to:
    receive, via a J1939 gateway of a cementing system, a code from at least one of the engine control module or the transmission control module, wherein the code is received in the event the received engine sensor data and/or transmission sensor data falls within one of one or more predetermined abnormal operating ranges or outside a predetermined normal operating range;
    compare the received code to a list of stored codes; and
    in response to the received code matching a stored code, causing a rendering of at least one of an alarm message associated with the matched code or a warning message associated with the matched code on the display, wherein the rendering further comprises rendering a list of alarm messages with each alarm message including an alarm number, date, time, alarm code, source and area.

2. The engine and transmission notification system of claim 1 wherein the alarm message comprises a code and a description associated with the code.

3. The engine and transmission notification system of claim 1 wherein the warning message comprises a code and a description associated with the code.

4. The engine and transmission notification system of claim 1 wherein the codes are diagnostic trouble codes (DTC) which further comprise suspect parameter numbers and failure mode identifiers.

5. The engine and transmission notification system of claim 1 wherein the rendering of at least one of an alarm message associated with the matched code or a warning message associated with the matched code on the display further comprises rendering a list of alarm messages and warning messages for each of matched codes.

6. The engine and transmission notification system of claim 1 further comprising a memory, wherein the memory stores a single list of codes.

7. The engine and transmission notification system of claim 1 wherein the engine and transmission system resides on a cementing skid.

8. The engine and transmission notification system of claim 1 wherein the engine and transmission system resides on a cementing truck.

9. The engine and transmission notification system of claim 1 wherein the plurality of engine sensors and the plurality of transmission sensors are continuously monitored.

10. The engine and transmission notification system of claim 1 wherein the rendering of at least one of an alarm message associated with the matched code or a warning message associated with the matched code on the display is via a graphical user interface (GUI).

11. The engine and transmission notification system of claim 1 wherein the computing device is a programmable logic controller.

12. A method comprising:
  receiving, via a J1939 gateway of a cementing system, a code from at least one of an engine control module or a transmission control module, wherein the code is received in an event that sensor data received by the engine control module and/or transmission control module falls within one of one or more predetermined abnormal operating ranges or outside a predetermined normal operating range;
  comparing the received code to a list of stored codes;
  in response to the received code matching a stored code, causing the rendering of at least one of an alarm message associated with the matched code or a warning message associated with the matched code, wherein the rendering further comprises rendering a list of alarm messages with each alarm message including an alarm number, date, time, alarm code, source and area.

13. The method of claim 12 wherein the received code is from a plurality of engine sensors and a plurality of transmission sensors.

14. The method of claim 12 wherein the receiving, comparing and causing is performed by a computing device.

15. The method of claim 14 wherein the computing device is a programmable logic controller.

* * * * *